United States Patent
Zhao

(10) Patent No.: US 9,589,365 B2
(45) Date of Patent: Mar. 7, 2017

(54) METHOD AND APPARATUS FOR EXPRESSING MOTION OBJECT

(71) Applicant: Ying Zhao, Beijing (CN)

(72) Inventor: Ying Zhao, Beijing (CN)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/629,650

(22) Filed: Feb. 24, 2015

(65) Prior Publication Data

US 2015/0243038 A1 Aug. 27, 2015

(30) Foreign Application Priority Data

Feb. 27, 2014 (CN) .......................... 2014 1 0069754

(51) Int. Cl.
*G06K 9/00* (2006.01)
*G06T 7/20* (2006.01)
*G06K 9/46* (2006.01)

(52) U.S. Cl.
CPC ........ *G06T 7/2033* (2013.01); *G06K 9/00348* (2013.01); *G06K 9/4671* (2013.01); *G06T 7/2053* (2013.01); *G06T 2207/10021* (2013.01); *G06T 2207/10028* (2013.01); *G06T 2207/30196* (2013.01)

(58) Field of Classification Search
CPC ............................ G06T 7/2033; G06K 9/4671
See application file for complete search history.

(56) References Cited

U.S. PATENT DOCUMENTS

| | | | |
|---|---|---|---|
| 7,212,651 B2 | 5/2007 | Viola et al. | |
| 7,330,566 B2 | 2/2008 | Cutler | |
| 8,189,866 B1 | 5/2012 | Gu et al. | |
| 8,345,984 B2 | 1/2013 | Ji et al. | |
| 2009/0016732 A1 | 1/2009 | Ueno et al. | |
| 2011/0228987 A1* | 9/2011 | Iwasaki ................. | G06T 7/2006 382/107 |
| 2011/0298898 A1 | 12/2011 | Jung et al. | |

(Continued)

OTHER PUBLICATIONS

U.S. Appl. No. 14/461,558, filed Aug. 18, 2014.
(Continued)

*Primary Examiner* — Oneal R Mistry
(74) *Attorney, Agent, or Firm* — Harness, Dickey & Pierce, PLC

(57) ABSTRACT

A method and an apparatus for expressing a motion object are disclosed. The method includes obtaining a stereo image in which the motion object has been captured, the stereo image including a depth image; extracting a key point from the motion object in the stereo image; determining, based on statistical information relating to three-dimensional motion of pixels within a first predetermined region surrounding the key point, a dominant direction of the key point; determining, based on the dominant direction of the key point, motion vectors of pixels within a second predetermined region surrounding the key point to obtain rotation invariant motion vectors; and extracting, based on the determined motion vectors of the pixels within the second predetermined region surrounding the key point, a feature describing the key point. The present invention can extract features of motion object that are irrelevant to a viewing angle of a camera.

18 Claims, 18 Drawing Sheets

(56) References Cited

U.S. PATENT DOCUMENTS

| | | | |
|---|---|---|---|
| 2012/0242794 A1* | 9/2012 | Park .................... | G06K 9/32 |
| | | | 348/46 |
| 2012/0306876 A1* | 12/2012 | Shotton ................ | G06T 17/10 |
| | | | 345/424 |
| 2013/0002814 A1* | 1/2013 | Park .................... | G06T 5/006 |
| | | | 348/43 |
| 2013/0033713 A1 | 2/2013 | Patana et al. | |
| 2015/0124059 A1* | 5/2015 | Georgiev ............. | G06T 7/002 |
| | | | 348/47 |

OTHER PUBLICATIONS

David G. Lowe, "Distinctive Image Features from Scale-Invariant Keypoints", International Journal of Computer Vision, 60, 2, (2004), pp. 91-110.

U.S. Office Action dated Mar. 23, 2016, issued in U.S. Appl. No. 14/697,804.

* cited by examiner

METHOD AND APPARATUS FOR EXPRESSING MOTION OBJECT

BACKGROUND OF THE INVENTION

1. Field of the Invention

The present invention generally relates to image processing, and specifically, a method and an apparatus for expressing a motion object in the computer vision technology.

2. Description of the Related Art

The image processing technology related to a motion object has various aspects, such as the recognition of an object itself, the recognition of the appearance of a motion object, the prediction of the movement of a motion object in a case of a moving person. Other examples include gesture recognition, object gender recognition, object age recognition, object emotion recognition or the like. These recognitions have important usage, for example, a human-computer interaction can be performed based on gesture recognition, an advertisement push can be performed based on object gender recognition, population statistics can be performed based on gender recognition and age recognition, and transformation of a human-computer interaction interface can be performed based on emotion recognition.

Generally, the image processing technology for automatically analyzing a motion object relates to three phases, feature extraction, model modeling or classifier training, and test sample analysis using the model or classifier. The feature extraction is very important.

During human motion such as a walking process, it is difficult to perform recognition for human-motions, because the viewing angles of a camera are different and images are different.

Technology for recognizing human-actions based on images have been provided.

The U.S. Pat. No. 8,189,866B1 discloses the technology of human-action recognition. In such technology, the human-actions in an image are recognized by providing extracted feature vectors to a classifier using a low-level feature (skin color, body edge or the like) detector and a high-level feature (a human face or the like) detector.

The U.S. Pat. No. 8,345,984B2 discloses the technology of human action recognition. In such technology, motion information in multiple adjacent frames is captured by performing 3D convolutions, and features are extracted from spatial and temporal dimensions; multiple channels of information is generated from video frames, the multiple channels of information is combined to obtain a feature representation for a 3D CNN model, and the 3D CNN model is applied to recognize human actions.

The U.S. Pat. No. 7,330,566B2 discloses the technology of motion object recognition based on a gait. In such technology, a subject is identified based on extracted stride length, cadence and height parameters of the subject.

The U.S. Pat. No. 7,212,651B2 discloses the technology of detecting a moving object in a temporal sequence of images. In such technology, images are selected from the temporally ordered sequence of images, a set of functions is applied to the selected images to generate a set of combined images, a linear combination of filters is applied to a detection window in the set of combined images to determine motion and appearance features of the detection window, and the motion and appearance features are summed to determine a cumulative score, which enables a classification of the detection window as including the moving object.

SUMMARY OF THE INVENTION

It is an object of the present invention to extract features that are irrelevant to a viewing angle, thereby eliminating or reducing influence of the change of the viewing angle to the recognition of a motion object or movement of an object.

According to an aspect of the present invention, a method for expressing a motion object includes obtaining a stereo image in which the motion object has been captured, the stereo image including a depth image; extracting a key point from the motion object in the stereo image; determining, based on statistical information relating to three-dimensional motion of pixels within a first predetermined region surrounding the key point, a dominant direction of the key point; determining, based on the dominant direction of the key point, motion vectors of pixels within a second predetermined region surrounding the key point to obtain rotation invariant motion vectors; and extracting, based on the determined motion vectors of the pixels within the second predetermined region surrounding the key point, a feature describing the key point.

According to another aspect of the present invention, an apparatus for expressing a motion object includes an image obtainment unit that obtains a stereo image in which the motion object has been captured, the stereo image including a depth image; a key point extraction unit that extracts a key point from the motion object in the stereo image; a dominant direction determination unit that determines, based on statistical information relating to three-dimensional motion of pixels within a first predetermined region surrounding the key point, a dominant direction of the key point; a motion vector determination unit that determines, based on the dominant direction of the key point, motion vectors of pixels within a second predetermined region surrounding the key point; and a feature description unit that extracts, based on the determined motion vectors of the pixels within the second predetermined region surrounding the key point, a feature describing the key point.

According to the motion object expressing method and the motion object expressing apparatus of embodiments of the present invention, a dominant direction of a key point is determined based on statistical information relating to three-dimensional motion of pixels within a region surrounding the key point, motion vectors of pixels within a region surrounding the key point are adjusted to obtain rotation invariant motion vectors, thus the motion vectors of the pixels within the region surrounding the key point are irrelevant to a viewing angle of a camera. And then, a feature of the key point is extracted based on the motion vectors of the pixels within the region surrounding the key point, thus the feature of the key point is also irrelevant to the viewing angle of the camera.

BRIEF DESCRIPTION OF THE DRAWINGS

The above aspects and merits and/or other aspects and merits of the present invention will become more apparent from the following detailed description of the embodiments of the present invention when read in conjunction with the accompanying drawings.

DETAILED DESCRIPTION OF THE PREFERRED EMBODIMENTS

In the following, embodiments of the present invention are described in detail with reference to the accompanying drawings, so as to facilitate the understanding of the present invention.

In the following description, as an example of a walking action of a human, it will be described how to extract a feature for specifying an action of a human body. However, it is just an example. The motion object is not limited to a human, and the present invention may also be applied to the analysis of the movement of an animal, a robot or other motion object. Furthermore, the action of the object is not limited to walking, and may also be a hand action, a head action or the like.

The embodiments will be described in the following order.

1. Description of Gist of Invention
2. Example of Application System
3. Functional Configuration of Motion Object Expressing Apparatus
4. First Embodiment of Motion Object Expressing Method
   4.1 Example of Obtainment Operation of Stereo Image
   4.2 Example of Extraction Operation of Key Point
   4.3 Example of Determination Operation of Dominant Direction of Key Point
   4.4 Example of Obtainment of Rotation Invariant Motion Vectors of Pixels within Region surrounding Key Point
   4.5 Extraction of Feature of Key Point based on Rotation Invariant Motion Vectors
5. Example of Motion Object Expressing Method
6. Computation System for Motion Object Expression <1. Description of Gist of Invention>

In a case where a shooting angle of a camera (for convenience, herein also referred to as the "viewing angle") changes, it is difficult to specify an object itself or its movement because of the change of images.

Figure 1A:
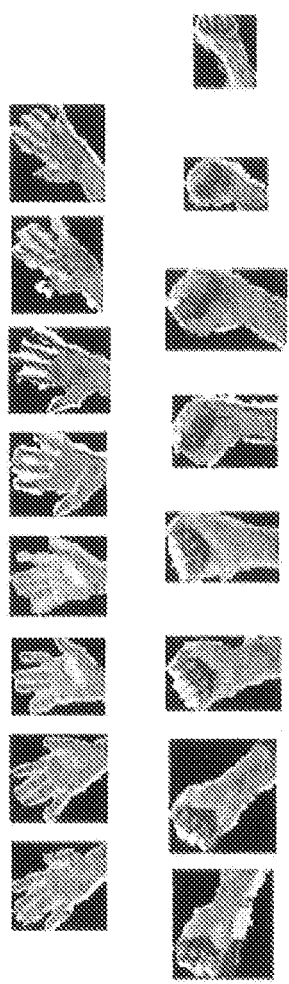
FIGS. 1A and 1B are drawings illustrating images of human actions taken from different viewing angles of a camera, FIG. 1A are drawings illustrating images of two statuses of opening and closing a hand taken by different viewing angles of the camera, and FIG. 1B are drawings illustrating images of a walking human taken by different viewing angles of the camera.
Figure 1B:
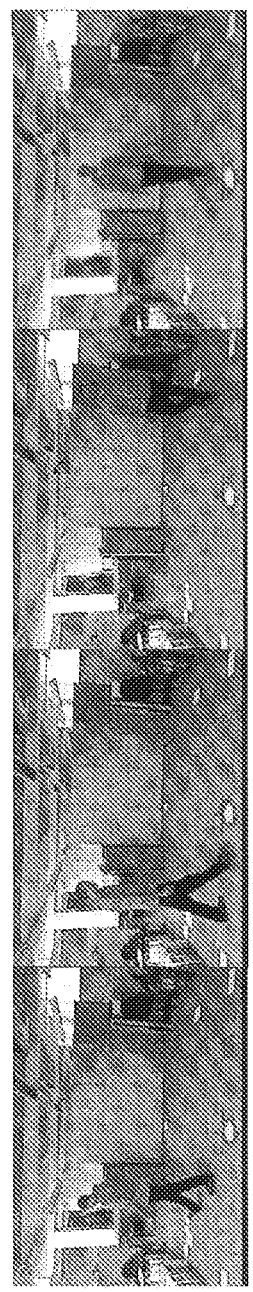

FIGS. 1A and 1B are drawings illustrating images of human actions taken from different viewing angles of a camera, FIG. 1A are drawings illustrating images of two statuses of opening and closing a hand taken by different viewing angles of the camera, and FIG. 1B are drawings illustrating images of a walking human taken by different viewing angles of the camera.

In order to facilitate the understanding of the present invention, before describing the specific embodiments of the present invention, the gist of the present invention will be described.

As the consideration of the inventor of the present invention, for a local region of a human body, a point in the local region is set as a key point, and motion information such as a motion vector of the key point can be obtained. Referring to the key point, by adjusting motion vectors of pixels within a local region surrounding the key point, the motion vectors of the pixels within the local region can express invariance with respect to the motion vector of the key point in different viewing angles.

For convenience, the gist of the invention will be described with reference to FIG. 2. It should be noted that, FIG. 2 is only for explaining the gist of the present invention, and there may not be this mutual motion relationship between points of the body part.

Figure 2A:
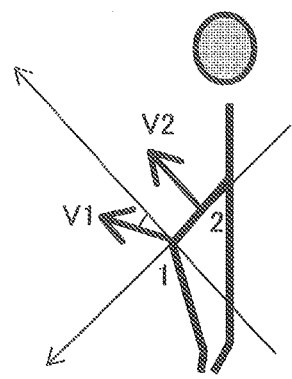
FIGS. 2A and 2B are drawings illustrating relative motion relationships of two points on a human leg.
Figure 2B:
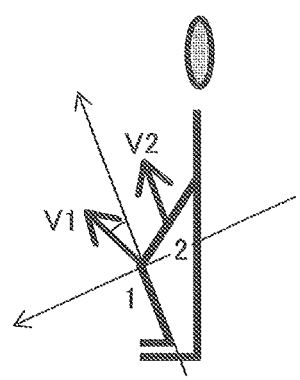

FIGS. 2A and 2B are drawings illustrating relative motion relationships of two points on a human leg. As illustrated in FIGS. 2A and 2B, point on the human leg is set as a key point, a motion vector of point 2 is represented by V2, and a motion vector of another point 1 on the human leg is represented by V1. If the motion vector V2 of the key point is set as a reference vector, an aspect of the motion vector V1 of point 1 with respect to the motion vector V2 of the key point, such as a relative angle between the vectors has a certain invariance.

Accordingly, at the consideration of the inventor of the present invention, a certain relative invariance can be obtained by adjusting the motion vectors of the pixels in the local region based on the motion vector of the key point, and negative impact of the change of the viewing point to the motion object analysis can be reduced by extracting a feature based on the adjusted motion vectors.

<2. Example of Application System>

Figure 3:
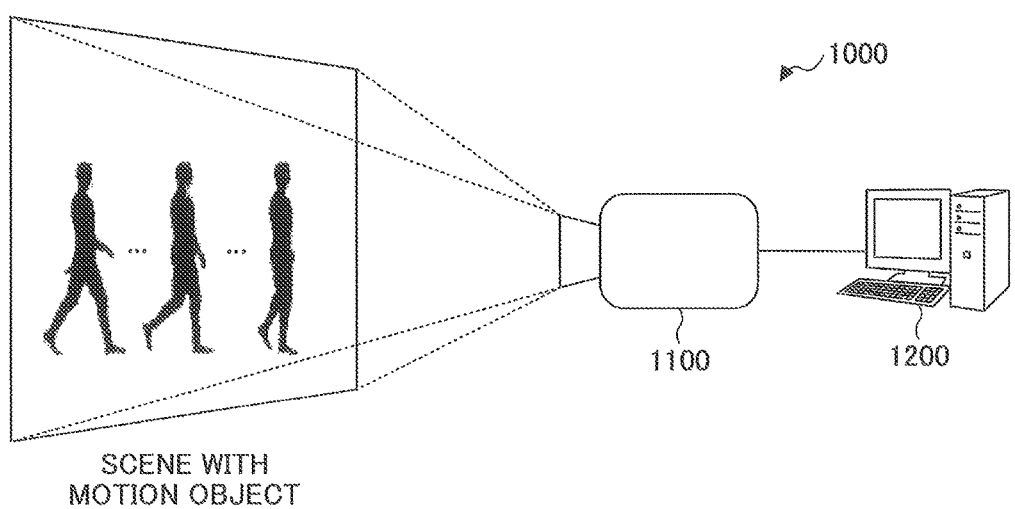
FIG. 3 is an overall structural drawing of an application system 1000 for analyzing human movement according to an embodiment of the present invention.

FIG. 3 is an overall structural drawing of an application system 1000 for analyzing human movement according to an embodiment of the present invention.

The application system 1000 may include a stereo camera 1100 and a computation apparatus 1200.

The stereo camera 1100 may be any camera that can obtain two-dimensional grayscale images (including color images) and depth images. It should be noted that, the camera of the present invention may include not only a separate stereo camera such as a binocular camera, but also an apparatus that is provided in another machine and can act as an image capture unit, such as an image capture unit in a mobile phone, a tablet PC or the like. Furthermore, the stereo camera may be a special-purpose camera for taking a stereo image, and may also be a camera having a stereo camera function by combining internal processing and external processing. Examples of the stereo camera includes Prime Sensor, Kinect and the like.

A sequence of the stereo images of a human walking taken by the stereo camera 1100 are sent to the computation apparatus 1200 by a USB connection, or other wired or wireless means.

The computation apparatus 1200 receives stereo images from the stereo camera 1100, and may perform processing such as image pre-processing, key point extraction, determination of the dominant direction of the key point, motion vector determination, extraction of the feature of the key point and the like thereby acting as a motion object expressing apparatus. Furthermore, the computation apparatus 1200 may also perform the extraction of the feature of the key point for training samples such as video images of a part of one cycle, or one or more cycles, obtain a feature vector representing object movement based on the extracted feature, and perform a fitting of a predetermined model or train a predetermined classifier based on the feature vector. Additionally, the computation apparatus 1200 may also receive testing samples offline or in real-time, such as video images of a part of one cycle, or one or more cycles, perform the extraction of the feature of the key point, obtain a feature vector representing object movement based on the extracted feature, and perform an analysis or a classification using the model or the classifier based on the feature vector. Thus, a motion analysis for the object is realized.

<3. Functional Configuration of Motion Object Expressing Apparatus>

Figure 4:
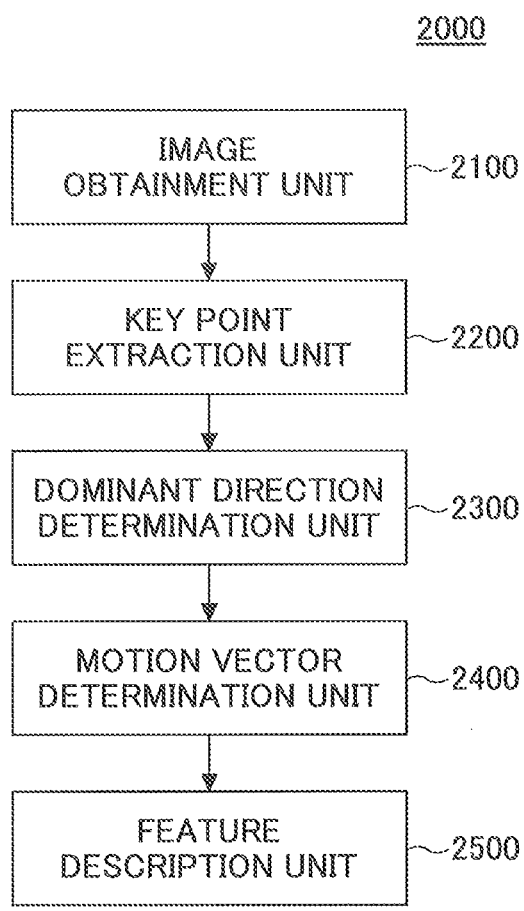
FIG. 4 is a drawing illustrating a functional configuration of a motion object expressing apparatus 2000 according to an embodiment of the present invention.

FIG. 4 is a drawing illustrating a functional configuration of a motion object expressing apparatus 2000 according to an embodiment of the present invention.

As illustrated in FIG. 4, the motion object expressing apparatus 2000 may include an image obtainment unit 2100, a key point extraction unit 2200, a dominant direction determination unit 2300, a motion vector determination unit 2400 and a feature description unit 2500.

The image obtainment unit 2100 obtains a stereo image in which the motion object has been captured, the stereo image including a depth image.

The key point extraction unit 2200 extracts a key point from the motion object in the stereo image.

The dominant direction determination unit 2300 determines, based on statistical information relating to a three-dimensional motion of pixels within a first predetermined region surrounding the key point, a dominant direction of the key point.

The motion vector determination unit 2400 determines motion vectors of pixels within a second predetermined region surrounding the key point, based on the dominant direction of the key point.

The feature description unit 2500 extracts, based on the determined motion vectors of the pixels within the second predetermined region surrounding the key point, a feature describing the key point.

It should be noted that, the units of the above motion object expressing apparatus 2000 may be implemented by a software program, for example, a CPU, a RAM, a ROM in a general purpose computer and software codes executed therein. The software program may be stored in a storage medium such as a flash memory, a floppy disk, a hard disk, an optical disk, and be loaded into a random access memory (RAM) and is executed by the CPU when the execution is performed. Besides the general purpose computer, it may also be implemented by an application Specific integrated circuit and software. The integrated circuit is implemented by, for example, one of a MPU (Microprocessor Unit), a DSP (Digital Signal Processor), a FPGA (Field Programmable Gate Array), an ASIC (Application Specific Integrated Circuit). Additionally, each of the units of the motion object expressing apparatus 2000 may be implemented by specialized hardware, such as a FPGA or an ASIC. Additionally, each of the units of the motion object expressing apparatus 2000 may also be implemented by the combination of software and hardware.

The scope of the present invention is not limited to the structure and number of the units in the above motion object expressing apparatus 2000. In an embodiment of the present invention, the image obtainment unit 2100, the key point extraction unit 2200, the dominant direction determination unit 2300, the motion vector determination unit 2400 and the feature description unit 2500 may be merged into an independent component to perform and implement corresponding functions and operations. The image obtainment unit 2100, the key point extraction unit 2200, the dominant direction determination unit 2300, the motion vector determination unit 2400 and the feature description unit 2500 may also be divided into smaller units to implement their functions and operations.

Additionally, it should be noted that, the configuration illustrated in FIG. 4 is not exclusive, and the motion object expressing apparatus 2000 may include other units, such as a model fitting unit or a classifier training unit for performing a fitting of a model or training a classifier, a communication unit for transmitting related information and/or intermediate processing results to the outside, and a display unit for displaying a recognition result of a motion object or a recognition result of the movement of the object.

<4. First Embodiment of Motion Object Expressing Method>

Figure 5:
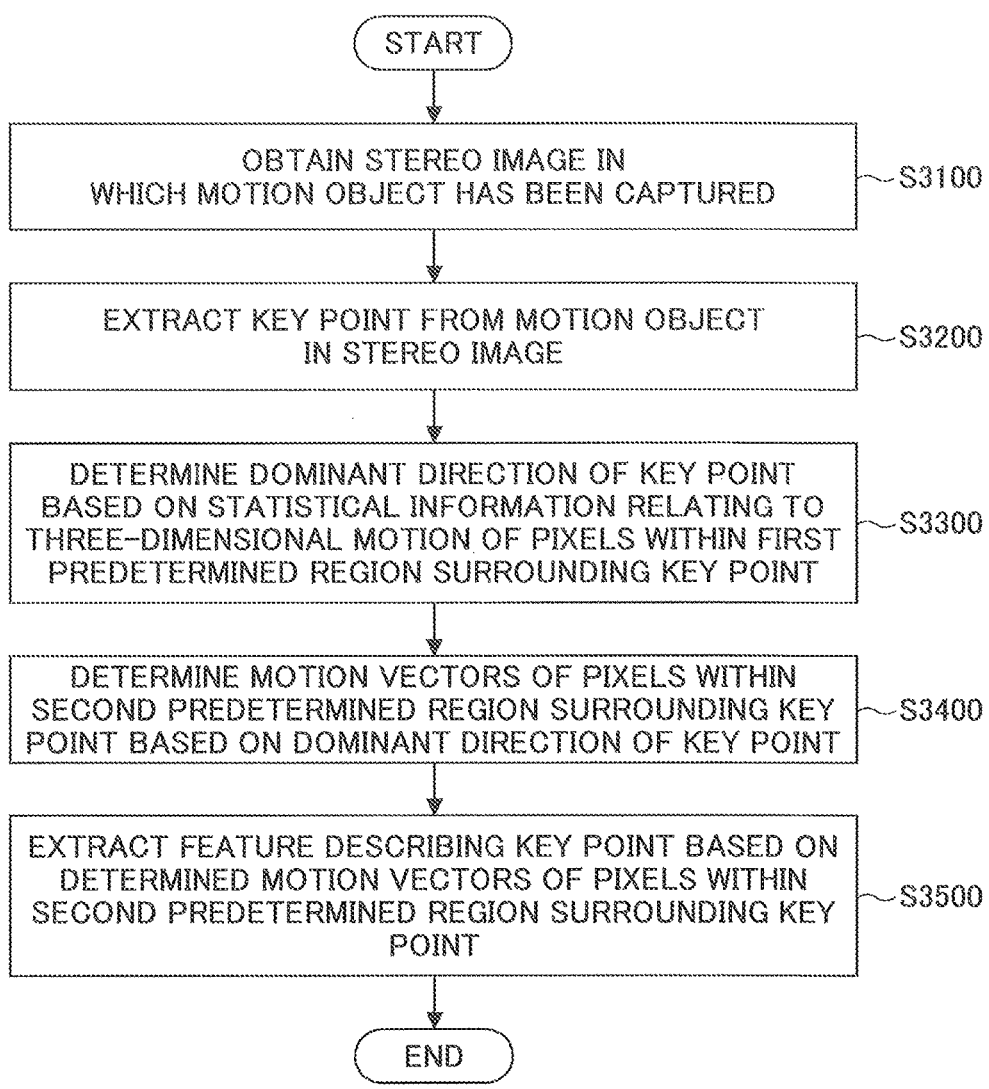
FIG. 5 is an overall flowchart illustrating a motion object expressing method according to an embodiment of the present invention.

FIG. 5 is an overall flowchart illustrating a motion object expressing method according to an embodiment of the present invention. Steps of the motion object expressing method may be performed by corresponding units illustrated in FIG. 4, and may also be performed by a general-purpose or special-purpose computation apparatus.

As illustrated in FIG. 5, in step S3100, a stereo image in which the motion object has been captured is obtained. The stereo image includes a depth image.

In step S3200, a key point is extracted from the motion object in the stereo image.

In step S3300, a dominant direction of the key point is determined based on statistical information relating to three-dimensional motion of pixels within a first predetermined region surrounding the key point.

In step S3400, motion vectors of pixels within a second predetermined region surrounding the key point are determined based on the dominant direction of the key point.

In step S3500, a feature describing the key point is extracted based on the determined motion vectors of the pixels within the second predetermined region surrounding the key point.

<4.1 Example of Obtainment Operation of Stereo Image>

In an example, the stereo image includes a depth image and a corresponding grayscale image.

The stereo image data may be image data including motion object portion, which was taken by a stereo camera such as a binocular camera.

In an example, the obtained stereo image may be image data after a pre-processing. In another example, a pre-processing operation may be performed after the stereo image is obtained.

Figure 6:
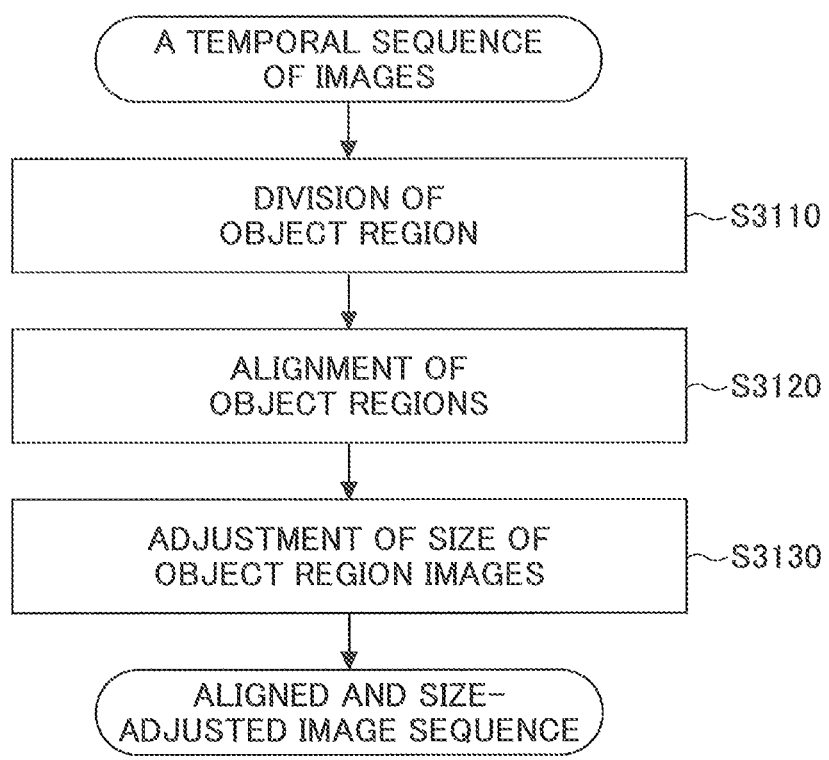
FIG. 6 is a flowchart illustrating a method of pre-processing a stereo image according to an embodiment of the present invention.

FIG. 6 is a flowchart illustrating a method of pre-processing a stereo image according to an embodiment of the present invention. The pre-processing may be incorporated into step S3100 or S3200 illustrated in FIG. 5, may be performed between step S3100 and S3200 as an independent step, and may also be performed before step S3100 and the processed image may serve as an object to be obtained in step S3100.

As illustrated in FIG. 6, in step S3110, an object region is obtained by division, and the object region may be a rectangular region.

The operation of this step relates to recognition and removal of background. This task may be completed by any technology, and for example, foreground information in a video may be detected by a technology of non-parametric background modeling. The technology for implementing this step may refer to, for example, the introduction of steps 408 and 410 of FIG. 4 in the above Patent Document U.S. Pat. No. 7,330,566B2.

In an example, the object region may be obtained by division using depth information, and for example, a division operation of the object region may be implemented by software included in an exchange software database of Kinect.

In step S3120, regions of a part of an object may be aligned to perform an alignment operation of the object. For example, as an example of a human body, center points of upper parts of the contours of the object in the images may be aligned with each other, so that the trunk parts of the human body in object regions of the image sequence can be aligned. In an example, the trunk part of the human body may be recognized using a model of the head and shoulder of the human body.

In step S3130, the sizes of the divided and aligned object region images are adjusted so that the contours of all of the objects have the same size, and the object region images after the pre-processing are obtained.

Figure 7:
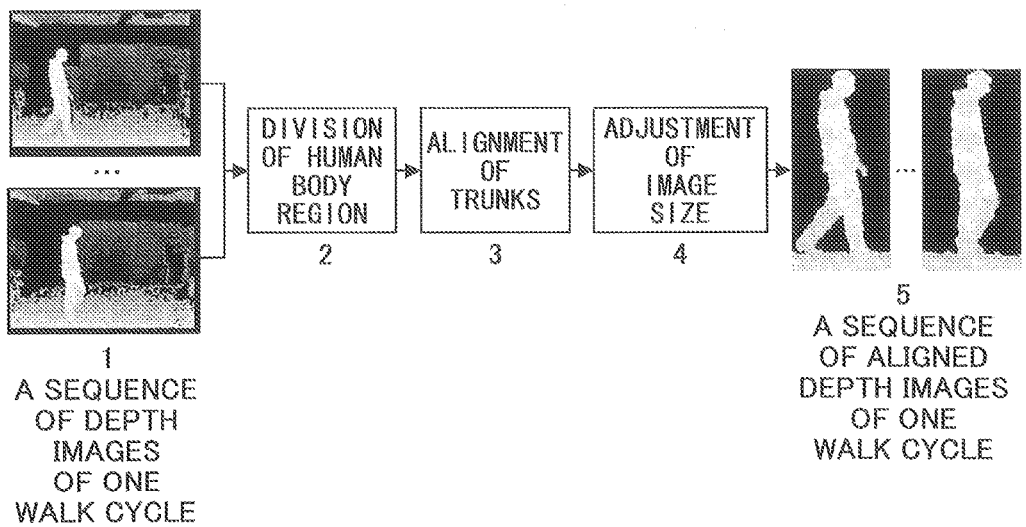
FIG. 7 is a drawing illustrating a data flow corresponding to the image pre-processing method.

FIG. 7 is a drawing illustrating a data flow corresponding to the image pre-processing method. (1) For images in an image sequence of one gait cycle illustrated by symbol "1", the parts of the human body region in the images are obtained by division; (2) an alignment operation of trunks is performed, (3) the size of the images are adjusted, and (4) the aligned and adjusted images of human body regions of one gait cycle are obtained.

In an example, the operations illustrated in FIGS. 6 and 7 may be performed in depth images; and then standard operations for grayscale images (including color images) corresponding to depth images may be performed, and for example, corresponding parts in grayscale images are extracted and the size of the extracted parts are adjusted.

<4.2 Example of Extraction Operation of Key Point>

Figure 8:
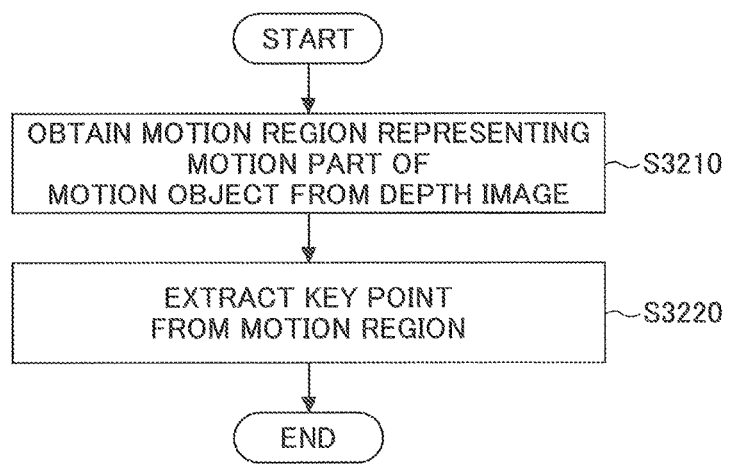
FIG. 8 is a flowchart illustrating a method of extracting a key point from a motion object in a stereo image according to an embodiment of the present invention.

FIG. 8 is a flowchart illustrating a method of extracting a key point a motion object in a stereo image according to an embodiment of the present invention. This method may be used to implement step S3200 in FIG. 5.

Figure 9:
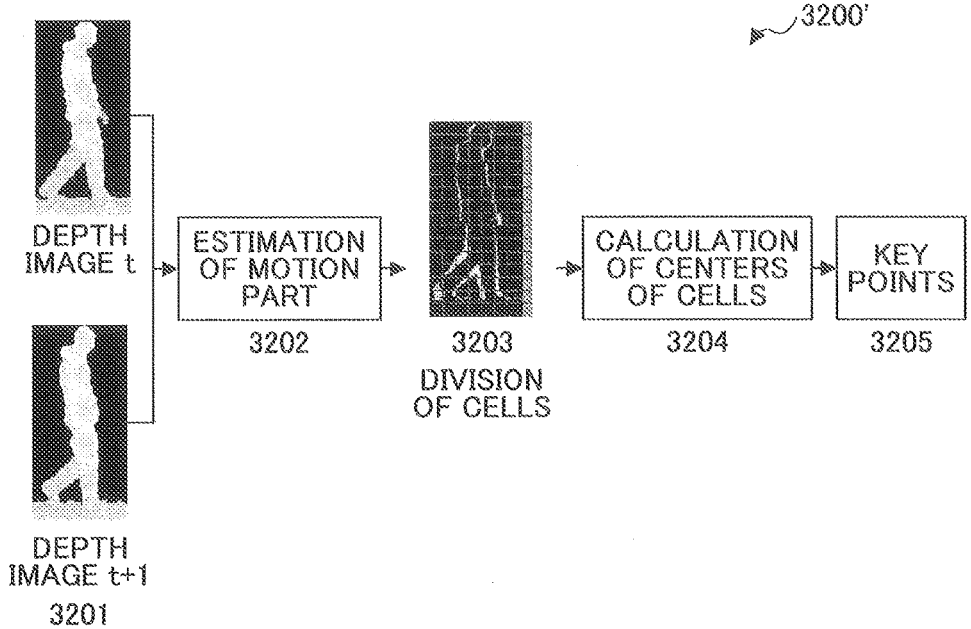
FIG. 9 is a drawing illustrating an operation process of a method of extracting a key point from a motion object in a stereo image according to an embodiment of the present invention in conjunction with a data flow.

FIG. 9 is a drawing illustrating an operation process of a method of extracting a key point from a motion object in a stereo image according to an embodiment of the present invention in conjunction with a data flow.

As illustrated in FIG. 8, in step S3210, a motion region representing a motion part of the motion object is obtained from the depth image.

For example, during walking by a human, it is desirable that a leg region or an arm region with a relative large motion magnitude is analyzed emphatically, because the motion of the leg region or the arm region can well represent posture characteristics of human walking.

Furthermore, as another example, for an action of a human gesture, it is desirable that a hand is analyzed emphatically.

In an example, the step of obtaining the motion region representing the motion part of the motion object from the depth image may include: performing a division of the depth image and temporally previous depth images to obtain a sequence of motion object regions, taking statistics of appearance frequencies of pixels at each position in the motion object regions, and determining and removing, based on the appearance frequencies of the pixels, basically stationary parts from the motion object regions. This operation is based on the following consideration. After the human bodies in the images are aligned, parts of human bodies that relatively do not move during a human action are essentially located in the same position, and parts with a large motion frequency and magnitude are not located in the same position. According to the statistics, a position with a high appearance frequency of the pixel in a human body corresponds to a basically stationary part in the human body, such as the chest or stomach. Thus, relative non-moving parts of the human body during a moving process can be determined and removed rapidly and relative moving parts can be left, based on appearance frequencies of the pixels at each of positions in video images in one motion cycle.

In the following, a method of obtaining a motion part of the object will be described in detail with reference to FIG. 10.

In step S3220, the key point is extracted from the motion region.

In an example, as illustrated in FIG. 9, the step of extracting the key point may include dividing motion region into smaller cells (3203 in FIG. 9), calculating centers of cells (3204 in FIG. 9), and setting centers of cells as key points, respectively (3205 in FIG. 9). If there is no effective pixel value in a cell (namely, the cell in FIG. 9 is an all-black cell without a white dot), extraction processing of the key point may not be performed for the cell.

As another example of the method of extracting the key points, it may be performed in grayscale images corresponding to the motion regions, and for example, the key points may be positioned by obtaining a Gaussian differential image of the grayscale images at different scales and calculating a local extreme value of the Gaussian difference. in some examples, a key point may be described using its scale (its scale in the Gaussian differential image), position, orientation or the like. The determination method of the key point in a two-dimensional grayscale image may refer to the article introduced in International Journal of Computer Vision, 60, 2 (2004), pp. 91-110, for which the authors is David G. Lowe and the title is "Distinctive image features from scale-invariant keypoints".

In the following, an example of the method of obtaining a motion part of the object will be described in detail with reference to FIG. 10. This method may be applied to step S3210 illustrated in FIG. 8.

Figure 10:
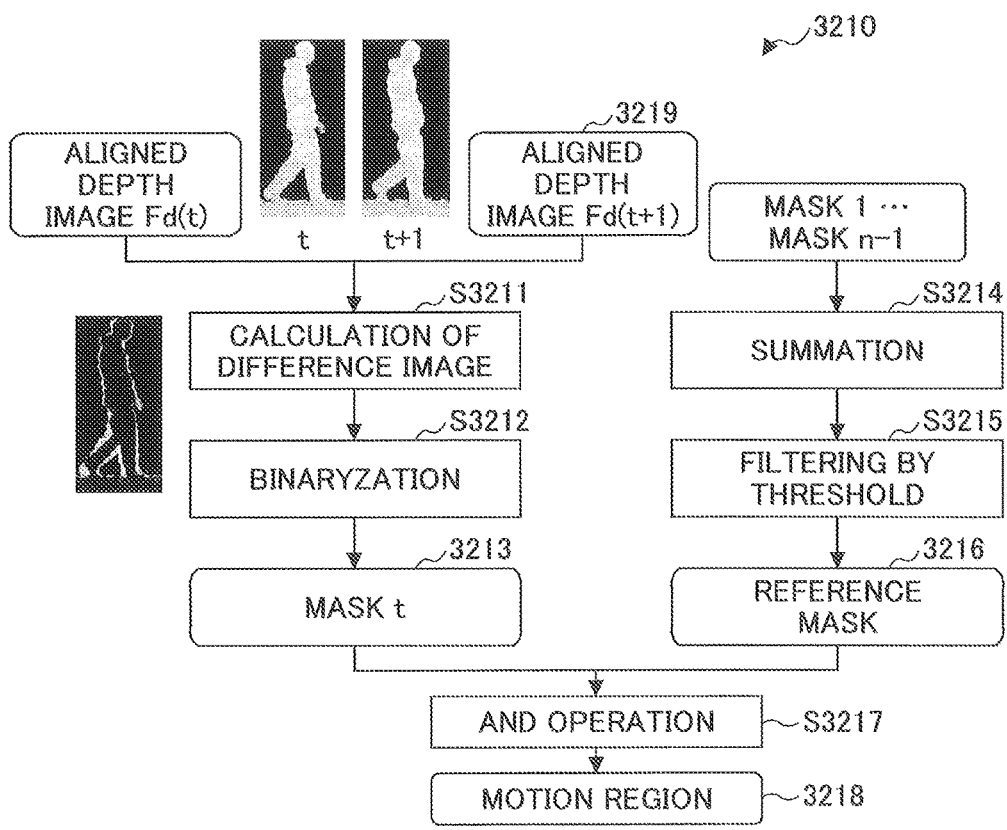
FIG. 10 is a flowchart illustrating a method of obtaining a motion part of the object.

It should be noted that, there is no dependency relationship between the left operations S3211 to S3213 and the right operations S3214 to S3216 above step S3217 in FIG. 10, and these steps may be performed in parallel or the right operations S3214 to S3215 may be performed in advance to obtain a reference mask.

As illustrated in FIG. 10, in step S3211, the difference between the pre-processed depth image Fd(t) and depth image Fd(t+1) 3219 (their depth images are illustrated near the blocks of 3219, respectively) are calculated to obtain a difference image (the difference image is illustrated at the left side of step S3211), thus the inner portion in the relative stationary part during human walking is removed, and the external outline portion in the relative stationary part is left because of a slight shaking or deformation of the trunk during the human walking. It may be removed using an AND operation (a logical AND) between a mask at a subsequent time t and a reference mask 3216.

And then, in step S3212, a binarization operation is performed for the difference image and the mask at time t (which is called "mask t") is obtained.

The reference mask 3216 is a reference mask obtained by performing summation of a cycle of masks (S3214) and filtering based on a threshold (S3215). In the reference mask 3216, most of the internal portions and the external portions of the relative stationary part during the human walking are removed and the outlines of the parts with a relative motion magnitude such as arms and legs are left.

In the calculation process of the reference mask, step S3214 corresponds to taking statistics of appearance frequencies of pixels at each position, and step S3215 may be a step of determining the positions with an appearance frequency of the pixel greater than a predetermined frequency threshold as the stationary part and removing the stationary part, and leaving the positions with an appearance frequency of the pixel less than the predetermined frequency threshold as the motion part, thereby obtaining the reference mask 3216.

In step S3217, a logical AND operation is performed for the mask t 3213 and the reference mask 3216, thereby obtaining an image consisting of contour pixels of the motion part of the human body (also called "motion region") 3218.

The extraction of the key point and the feature of the key point are performed for this motion region, thus the influence of the change of outerwear such as bags, shoes, clothes and the like to the expression and recognition of the object can be reduced.

Returning to FIG. 8, the motion region may be input to step S3220 to extract the key point.

The exemplary method for extracting the key point by focusing the motion region was described above with reference to FIG. 8, and it is particularly useful for describing the movement of the object. However, in some cases, for example, in a case of object recognition, the key point may also be extracted from the relative stationary part of the object.

For convenience, FIG. 9 illustrates a specific process of extracting a key point in conjunction with a data flow.

In this process, based on the input depth images, such as all or a part of the aligned and size-adjusted images of the image sequence in one gait cycle illustrated in FIG. 7 (3201 in FIG. 9), an estimation of a motion part is performed (3202 in FIG. 9), the estimated motion part is divided into cells (3203 in FIG. 9), and centers of the cells are calculated as the key points, respectively (3204 and 3205 in FIG. 9).

<4.3 Example of Determination Operation of Dominant Direction of Key Point>

In an example, the step of determining the dominant direction of the key point based on the statistical information relating to the three-dimensional motion of the pixels within the first predetermined region surrounding the key point includes: obtaining a two-dimensional histogram in which the depth of the motion vectors of the pixels serve as one dimension and directions of components of the motion vectors of the pixels in planes perpendicular to the depth serve as another dimension, and determining the dominant direction of the key point based on a direction relating to a peak value in the two-dimensional histogram.

Figure 11:
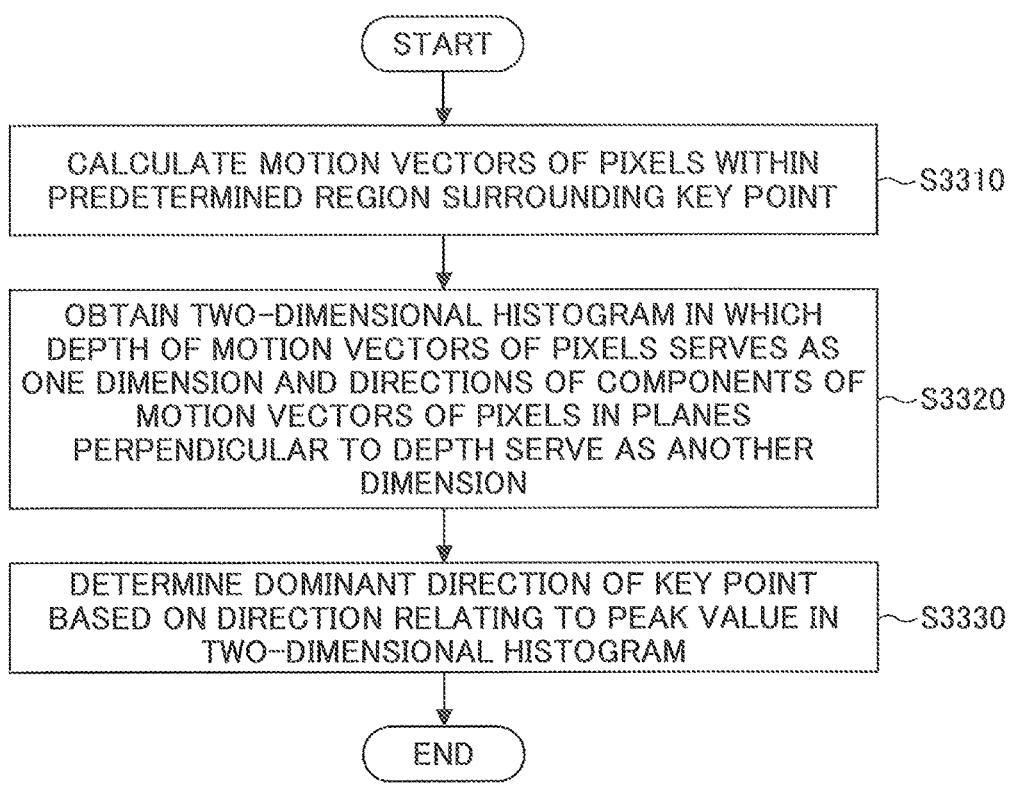
FIG. 11 is a flowchart illustrating a method of determining a dominant direction of the key point according to an embodiment of the present invention.

FIG. 11 is a flowchart illustrating a method of determining a dominant direction of the key point according to an embodiment of the present invention. This method may be applied to step S3300 in FIG. 5.

As illustrated in FIG. 5, in step S3310, motion vectors of pixels within a predetermined region surrounding the key point are calculated.

In step S3320, a two-dimensional histogram in which the depth of the motion vectors of the pixels serve as one dimension and directions of components of the motion vectors of the pixels in planes perpendicular to the depth serve as another dimension, is obtained.

Figure 12:
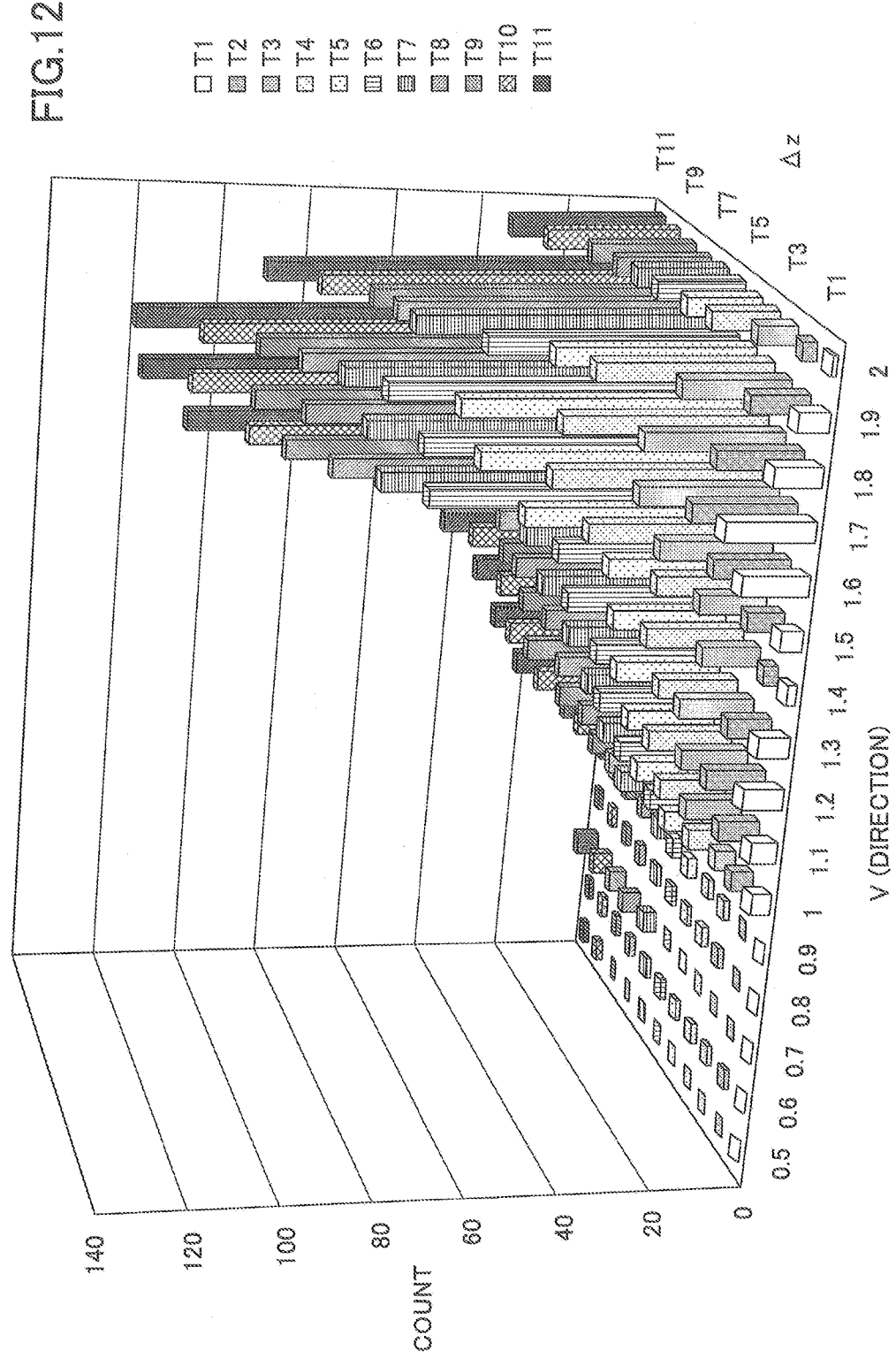
FIG. 12 is a schematic drawing illustrating a two-dimensional histogram of motion vectors of pixels within a region surrounding the key point.

FIG. 12 is a schematic drawing illustrating a two-dimensional histogram of motion vectors of pixels within a region surrounding the key point. The first dimension is the direction V of the motion vector of the pixel, the second dimension is the depth $\Delta z$ of the motion vector of the pixel, and the third dimension is the number of pixels whose motion vector is specified by the values of the first and second dimensions.

In step S3330, the dominant direction of the key point is determined based on a direction relating to a peak value in the two-dimensional histogram.

In the following, the method of calculating the motion vectors of the pixels in step S3310 will be described.

Before that, for convenience, the motion vector of the pixel will be described.

Figure 13:
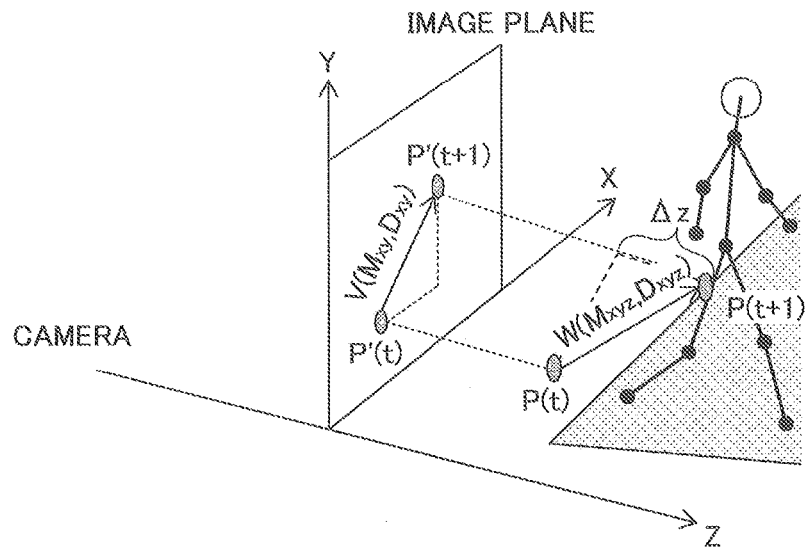
FIG. 13 is a drawing illustrating 2D and 3D motion vectors of the pixels.

FIG. 13 is a drawing illustrating 2D and 3D motion vectors of the pixels, and a key point P on a human body moves from P(t) to P(t+1) in a real world coordinate system. A corresponding movement in the image plane (X,Y) is from P(t)' to P(t+1)'. W(Mxyz,Dxyz) is a 3D (three-dimensional) motion vector of the key point P, where Mxyz represents the magnitude of the 3D motion vector and Dxyz represents the direction of the 3D motion vector. V(Mxy,Dxy) is a corresponding 2D motion vector in the image plane (X,Y), where Mxy represents the magnitude of the 2D motion vector and Dxy represents the direction of the 2D motion vector. The component of the motion vector of the key point P in the depth direction is $\Delta z$. Supposing that the dominant direction of the key point is the direction of W(Mxyz,Dxyz). In the following, the 3D dominant direction of the key point serves as a reference, and the actions of the pixels within the region surrounding the key point will be described. As a simplified example, the direction of the 2D motion vector component V(Mxy,Dxy) of the 3D motion vector W(Mxyz,Dxyz) in the XY plane may be set as the dominant direction, and a coordinate axis (such as the X axis) of the image plane may rotate to the direction of the 2D motion vector component V(Mxy,Dxy). In another example, the motion magnitude of the pixels in the depth direction, which are within the region surrounding the key point may be adjusted (for example, may be normalized), using the dominant component $\Delta z$ of the 3D motion vector of the key point in the depth direction as an adjustment factor (for example, a normalization factor).

Figure 14A:
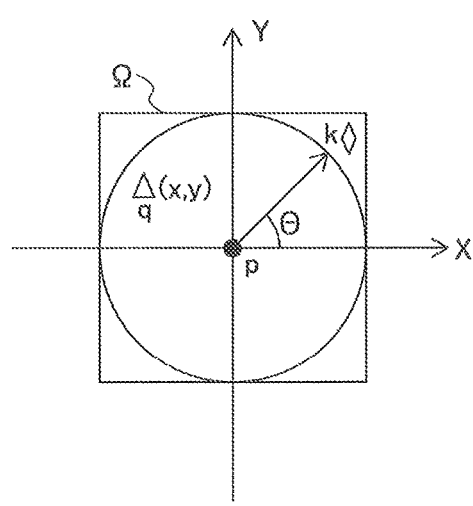
FIGS. 14A and 14B are drawings illustrating regions surrounding the key point before and after rotation of a reference coordinate system.
Figure 14B:
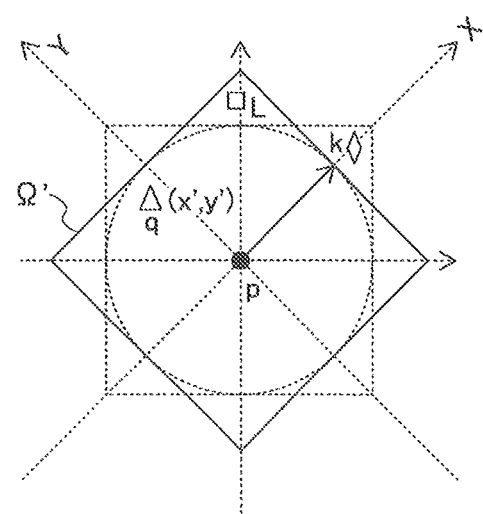

FIGS. 14A and 14B are drawings illustrating regions surrounding the key point before and after rotation of a reference coordinate system. In FIG. 14A, p is the key point, $\theta$ is the dominant direction of the key point, the square region $\Omega$ is a neighbourhood region of the key point, the key point p is located at the center of the region $\Omega$, the small triangle illustrated by q is a point in the region $\Omega$, which the coordinate is (x,y), the small diamond illustrated by k is another point in the region $\Omega$. As illustrated in FIG. 14B, after the coordinate axis, for example, the x axis rotates to the dominant direction of the key point, the neighbourhood region of p becomes the rectangular region $\Omega'$, the coordinate of q becomes (x',y'), the point k does not belong to the neighbourhood region of the key point p after the reference coordinate system rotates, and the point L that did not originally belong to the neighbourhood region of the key point p (the small rectangle illustrated by L is a point in the region $\Omega'$) belongs to the neighbourhood region of the key point p after the reference coordinate system rotates. In this case, the neighbourhood region after the rotation changes and there may be differences between the pixels in the neighbourhood regions before and after the rotation, thus the motion vectors of the pixels may be re-calculated after the rotation.

Figure 15:
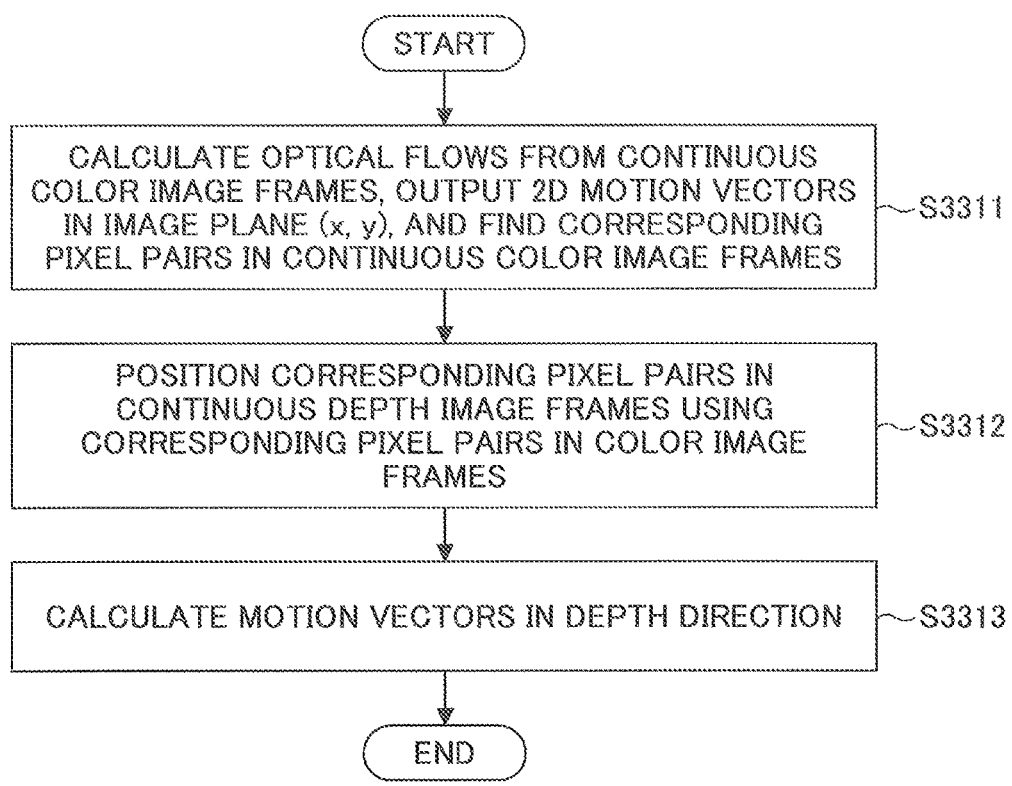
FIG. 15 is a flowchart illustrating a method of calculating the motion vectors of the pixels according to an embodiment of the present invention.

FIG. 15 is a flowchart illustrating a method of calculating the motion vectors of the pixels according to an embodiment of the present invention, and this method may be applied to step S3310 illustrated in FIG. 11.

In step S3311, optical flows are calculated from continuous color image frames, the 2D motion vectors in the image plane (x,y) are output, and corresponding pixel pairs in continuous color image frames are found.

In step S3312, the corresponding pixel pairs in continuous depth image frames are positioned using the corresponding pixel pairs in the color image frames.

In step S3313, the motion vectors in the depth direction are calculated.

Figure 16:
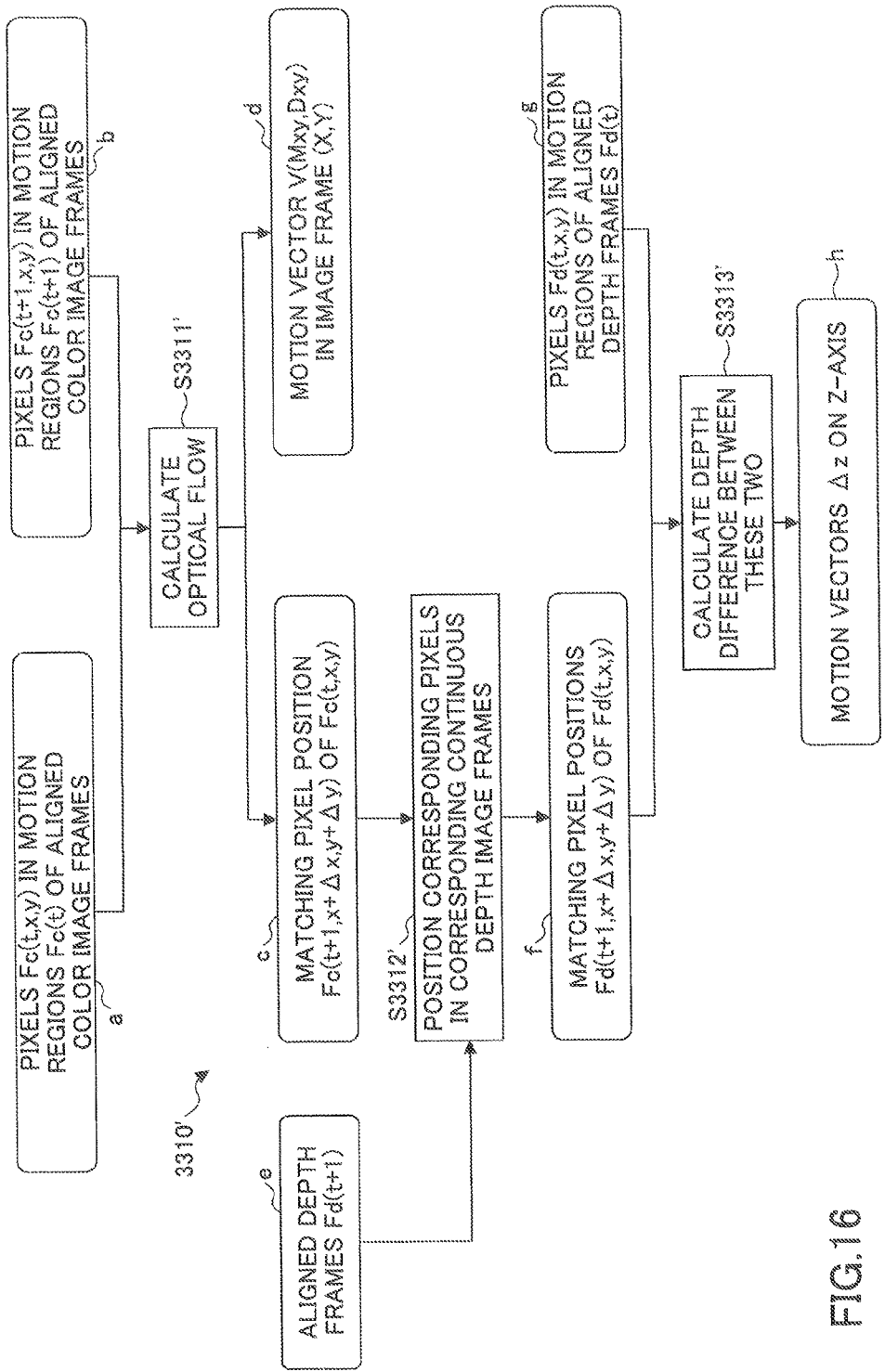
FIG. 16 is a flowchart illustrating a method of calculating the motion vectors in an image plane direction and a depth direction according to an embodiment of the present invention in conjunction with a data flow.

FIG. 16 is a flowchart illustrating a method of calculating the motion vectors in an image plane direction and a depth direction according to an embodiment of the present invention in conjunction with a data flow, and this method may be applied to step S3310 illustrated in FIG. 11.

As illustrated in FIG. 16, in step S3311', optical flows are calculated, based on pixels Fc(t,x,y) (a in FIG. 16) in the motion region Fc(t) and pixels Fc(t+1,x,y) (b in FIG. 16) in the motion region Fc(t+1) of the input and aligned color image frames, and the motion vectors V(Mxy,Dxy) in the image plane (x,y) (d in FIG. 16) and matching pixel positions Fc(t+1,x+$\Delta$x,y+$\Delta$y) (c in FIG. 16) of Fc(t,x,y) in the frame Fc(t+1) are obtained. Accordingly, in step S3312', corresponding pixels in corresponding continuous depth image frames Fd(t+1) are positioned based on the aligned depth frames Fd(t+1) (e in FIG. 16), and matching pixel positions Fd(t+1,x+$\Delta$x,y+$\Delta$y) (f in FIG. 16) of Fd(t,x,y) are obtained. In step S3313', depth differences between pixels Fd(t,x,y) in the motion region of the aligned depth frames Fd(t) and pixels Fd(t+1,x+$\Delta$x,y+$\Delta$y) in the motion region of the corresponding aligned depth frames Fd(t+1) are calculated, thereby obtaining the motion vectors $\Delta z$ in the depth direction (z-axis)

<4.4 Example of Obtainment of Rotation Invariant Motion Vectors of Pixels within Region Surrounding Key Point>

Figure 17:
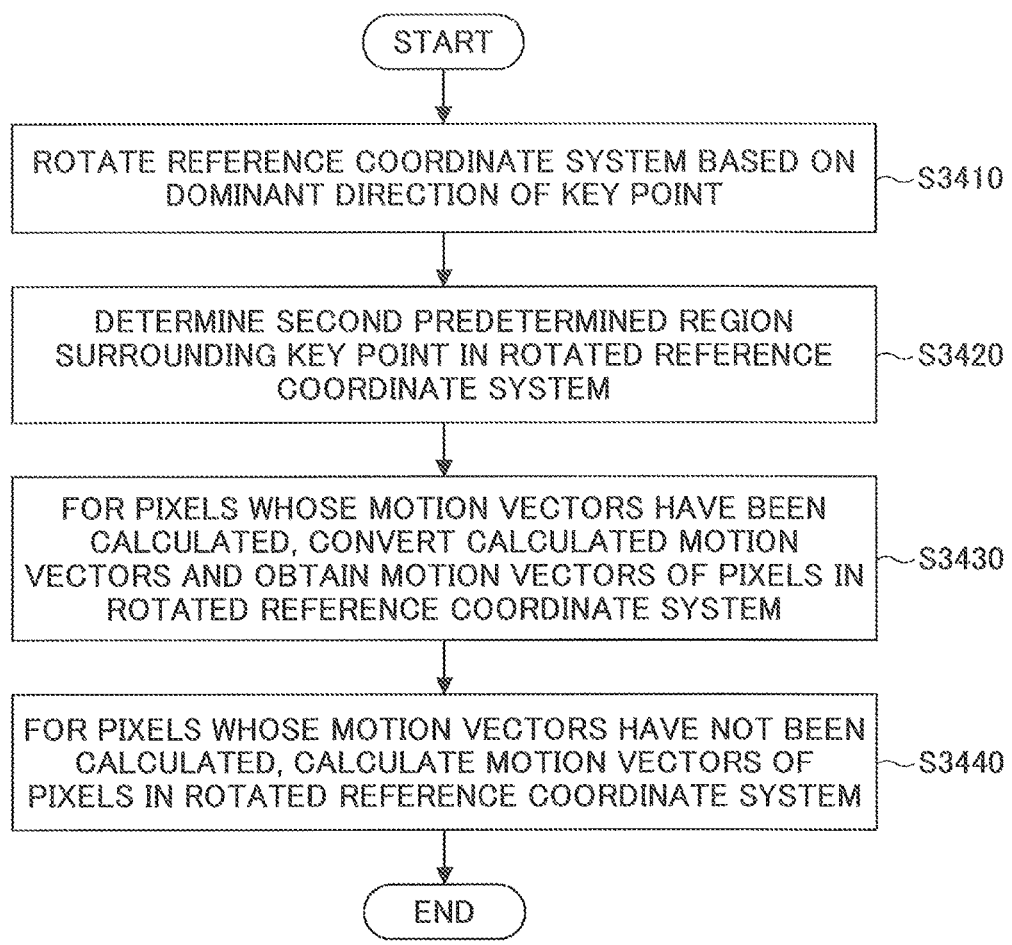
FIG. 17 is a flowchart illustrating a method of obtaining rotation invariant motion vectors of the pixels within the region surrounding the key point based on the dominant direction of the key point according to an embodiment of the present invention.

FIG. 17 is a flowchart illustrating a method of obtaining rotation invariant motion vectors of the pixels within the region surrounding the key point based on the dominant direction of the key point according to an embodiment of the present invention, and this method may be applied to step S3400 in FIG. 5.

As illustrated in FIG. 17, in step S3410, a reference coordinate system is rotated based on the dominant direction of the key point. For example, as illustrated in FIG. 14B, the x-axis of the reference image coordinate system is rotated to the dominant direction of the key point.

In step S3420, in the rotated reference coordinate system, the second predetermined region surrounding the key point is determined. For example, as illustrated in FIG. 14B, a rectangular region $\Omega'$ whose sides are parallel to the x-axis or y-axis and center is the key point.

In step S3430, for pixels whose motion vectors have been calculated, the calculated motion vectors are converted and motion vectors of the pixels in the rotated reference coordinate system are obtained.

In an example, the step of converting the calculated motion vectors includes rotating the motion directions of the calculated motion vectors in the plane perpendicular to the depth direction by an angle corresponding to the dominant direction of the key point.

In another example, the step of converting the calculated motion vectors may include determining, based on statistical information relating to three-dimensional motion of pixels within a first predetermined region surrounding the key point, motion magnitude in the depth direction relating to the key point, such as $\Delta z$ in FIG. 12. Furthermore, the step of converting the calculated motion vectors may also include subtracting the motion magnitude in the depth direction relating to the key point from value of motion magnitude of the calculated motion vector in the depth direction, and rotating the motion directions of the calculated motion vectors in the plane perpendicular to the depth direction by an angle corresponding to the dominant direction of the key point.

In step S3440, for the pixels whose motion vectors have not been calculated, the motion vectors of the pixels in the rotated reference coordinate system are calculated.

For example, as illustrated in FIG. 14B, for a pixel L that newly enters the neighbourhood region of the key point, the motion vector of the pixel in the rotated reference coordinate system may be calculated, if the motion vector has not been calculated.

According to the above converting operation, the dominant direction of the key point is set as a reference direction and the motion vectors of the pixels in the region surrounding the key point are rotated, thus rotation-invariance can be realized and the obtained motion feature can be irrelevant to the viewing angle of the camera.

<4.5 Extraction of Feature of Key Point Based on Rotation Invariant Motion Vectors>

Figure 18:
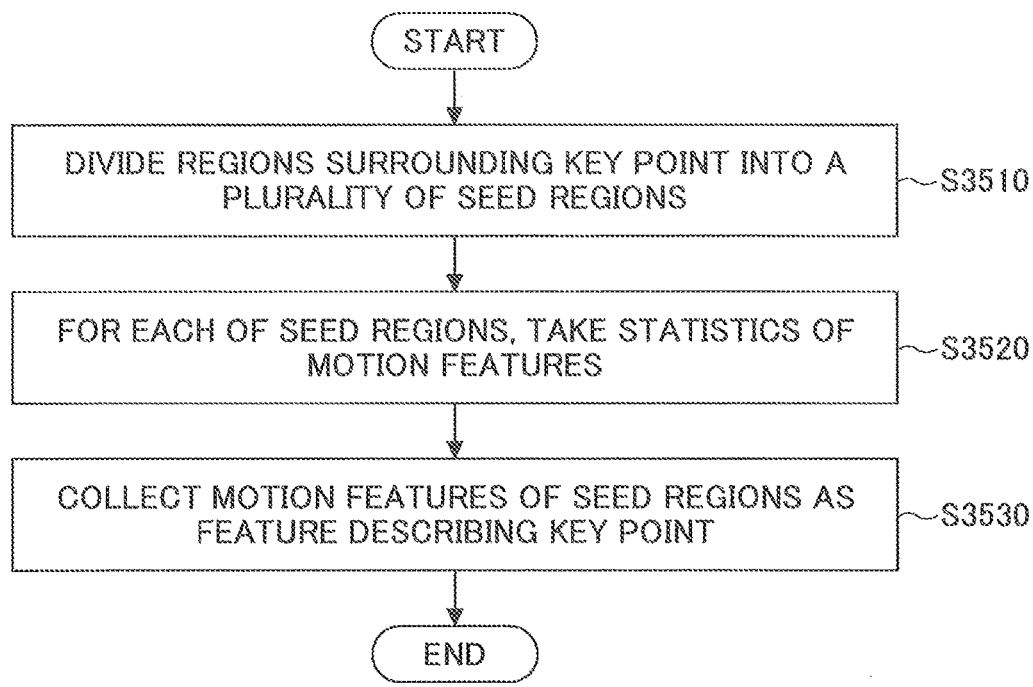
FIG. 18 is a flowchart illustrating a method of extracting a feature of the key point based on the motion vectors of the pixels within the region surrounding the key point according to an embodiment of the present invention.

FIG. 18 is a flowchart illustrating a method of extracting a feature of the key point based on the motion vectors of the pixels within the region surrounding the key point according to an embodiment of the present invention, and this method may be applied to step S3500 illustrated in FIG. 5.

As illustrated in FIG. 18, in step S3510, the region surrounding the key point is divided into a plurality of seed regions.

Figure 19:
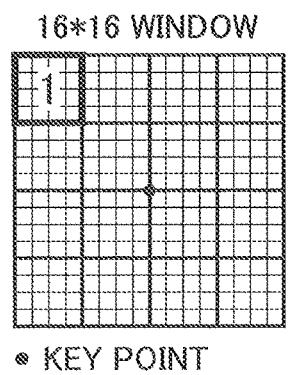
FIG. 19 is a drawing illustrating division of the region surrounding the key point and seed regions for the extraction of the feature of the key point.

For example, the region surrounding the key point is a window whose size is 16*16 and center is the key point. The region is divided into seed regions whose size is 4*4. The rectangular region illustrated by symbol 1 at the upper left corner in FIG. 19 is an example of a seed region.

In step S3520, for each of the seed regions, statistics of the motion features are taken.

Figure 20:
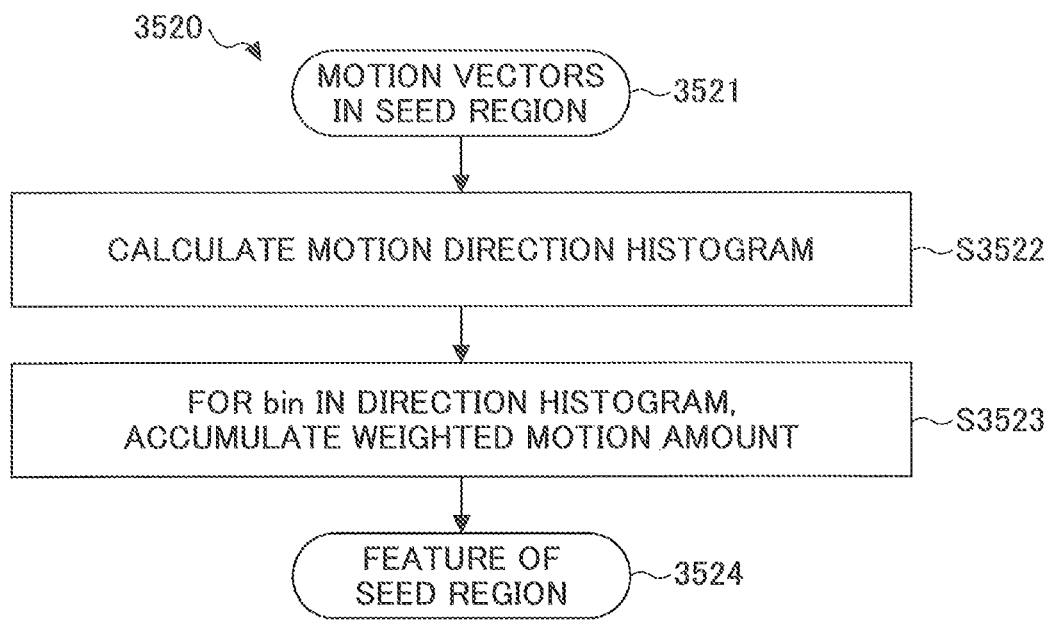
FIG. 20 is a flowchart illustrating a method of taking statistics of motion features for each of the seed regions according to an embodiment of the present invention.

FIG. 20 is a flowchart illustrating a method of taking statistics of motion features for each of the seed regions according to an embodiment of the present invention.

As illustrated in FIG. 20, in step S3522, a motion direction histogram is calculated based on the motion vectors in the seed regions (3521).

Figure 21:
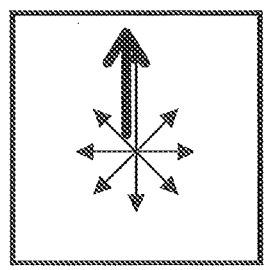
FIG. 21 is a drawing illustrating an angle division relationship of eight bins of a direction histogram.

In an example, the direction histogram may be divided into 8 bins, each of the bins covering 45 degrees. FIG. 21 is a drawing illustrating an angle division relationship of eight bins of a direction histogram.

Directions (expressed in degrees) of the motion vectors of the pixels in the seed regions in the image reference plane (x,y) are obtained, and the pixels are allocated to corresponding bins based on angles relating to the directions and accumulation is performed. In an example, a weighting process of the pixels in the corresponding motion direction may be performed, using magnitude information of the motion vectors of the pixels including the magnitude in the depth direction (for example, adding the magnitude in the depth direction and the magnitude in the image reference plane (x,y)), and the weights may be calculated using a Gaussian function.

In step S3530, the motion features of the seed regions are collected as a feature describing the key point.

For example, as an example of 16 seed regions illustrated in FIG. 19, the feature of each of the seed regions is weighted statistics of pixels in 8 bins, and a 128-dimensional (16*8=128) feature vector may be obtained by collecting the features of the seed regions, as a feature vector for describing the key point.

Figure 22:
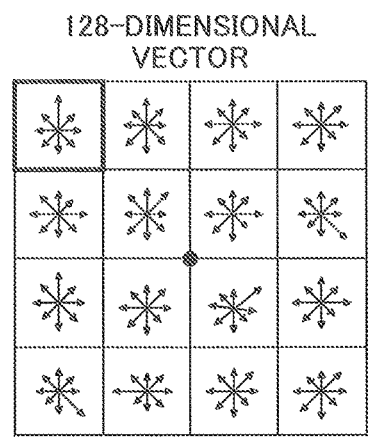
FIG. 22 is schematic drawing illustrating 128-dimensional feature vector of the key point.

FIG. 22 is schematic drawing illustrating 128-dimensional feature vector of the key point.

As an example, the 128-dimensional feature vector F may be F=[18;6;2;0;0;0;0;16;43;7;0;0;0;0;10;31;33;10;0;0;0;0; 24;33;39;1;0;0;0;0;19;125;38;20;12;4;0;1;11;128;26; 4;0;0; 1;37;96;26;12;15;3;2;27;128;64;128;8;2;1;1;5;20; 128;61; 17;3;2;0;0;6;52;100;70;47;5;12;8;11;45;18;99; 128;8;5;10; 11;11;128;128;28;1;1;2;3;12;82;78;4;3;2;0; 1;8;41;32;8;5; 23;21;45;44;8;22;23;2;8;18;128;81;128;6 0;4;0;3;13;37; 23].

It should be noted that, the number of bins may be less or more than 8, and the number of dimensions of the feature vector F may be less than or more than 128.

The motion object expressing apparatus and the motion object expressing method according to the embodiment of the present invention are described above with reference to the drawings. The essence of the present invention is a method of extracting a feature of a key point. In this method, a dominant direction of a key point is determined based on statistical information relating to three-dimensional motion of pixels within a region surrounding the key point, motion vectors of pixels within a region surrounding the key point are adjusted to obtain rotation invariant motion vectors, thus the adjusted motion vectors of the pixels within the region surrounding the key point are irrelevant to a viewing angle of a camera. And then, a feature of the key point is extracted based on the motion vectors of the pixels within the region surrounding the key point, thus the feature of the key point is also irrelevant to the viewing angle of the camera.

The method of extracting the feature of the key point may be used in a subsequent process. For example, the feature extraction is performed for one or more motion cycles of a training sample or one or more cycles of a part of an image sequence to obtain feature vectors, and a model fitting or a classifier training is performed. Furthermore, the feature extraction may be performed for one or more motion cycles of a testing sample or one or more cycles of a prat of an image sequence to obtain feature vectors, and the feature vectors may be input to the fitted model or the trained classifier to obtain model output or a classification result of the classifier.

<5. Example of Motion Object Expressing Method>

The above method of extracting the feature of the motion object according to the embodiment of the present invention may be applied to a recognition application of the motion object.

It should be noted that, a broad understanding should be taken for the motion object recognition in the present invention. The motion object recognition may include not only recognition of the object itself but also recognition of actions relating to the object. The recognition of the object itself may include different levels, and for example, an object class and other classes may be divided (for example, the human and the vehicle are classified), or identity recognition of objects may be performed (for example, a person and another person are classified). The recognition of actions relating to the object may also include different levels, and for example, an action and other actions may be classified (for example, a hand-holding action and a hand-swinging action are classified), or an analysis of different gestures during the same action (for example, an analysis of statuses from hand-opening to hand-closing during a hand-holding action) may be performed.

Figure 23:
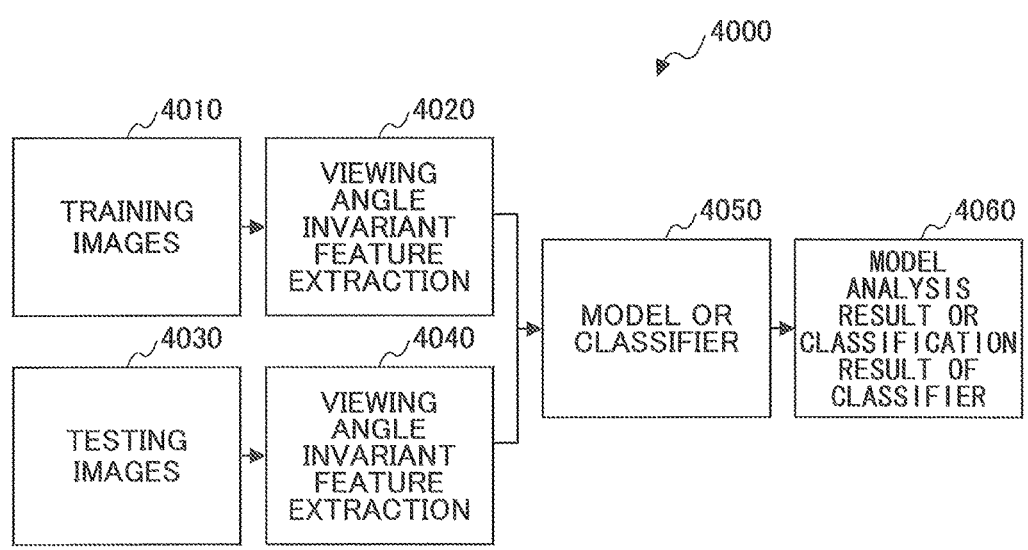
FIG. 23 is a drawing illustrating an overall operation process of a general motion object recognition method.

FIG. 23 is a drawing illustrating an overall operation process of a general motion object recognition method 4000.

Specifically, the motion object recognition method includes a training process and a testing process.

In the training process, for one or more of temporal sample depth images (4010) of the motion object in at least one motion period, operations of extracting the key point performing, determining the dominant direction of the key point, rotating the motion vectors of the pixels and extracting the feature of the key point are performed to obtain a set of the features of the key point for training (4020), and a predetermined classifier is trained based on the set of the feature of the key point for training (4050).

In the testing process, one or more of temporal test depth images of the motion object in at least one motion period are received (4030), operations of extracting the key point, determining the dominant direction of the key point, rotating the motion vectors of the pixels and extracting the feature of the key point are performed to obtain set of the features of the key point for testing (4040), and the motion object relating to the test depth images are classified based on the set of the features of the key point for testing and the trained predetermined classifier (4050).

It should be noted that, the operation of viewing angle invariant feature extraction (4020) and the operation of viewing angle invariant feature extraction (4040) may share the same software, hardware and firmware.

The model or classifier relating to the training phase or testing phase is the same model or classifier, the parameter or structure of the model or classifier is trained in the training phase, and analysis or classification is performed in the testing phase using the established model or the trained classifier.

The recognition of the motion object may include and not be limited to gender recognition of the motion object, identity recognition of the motion object, gait recognition of the motion object and gesture recognition of the motion object.

Figure 24:
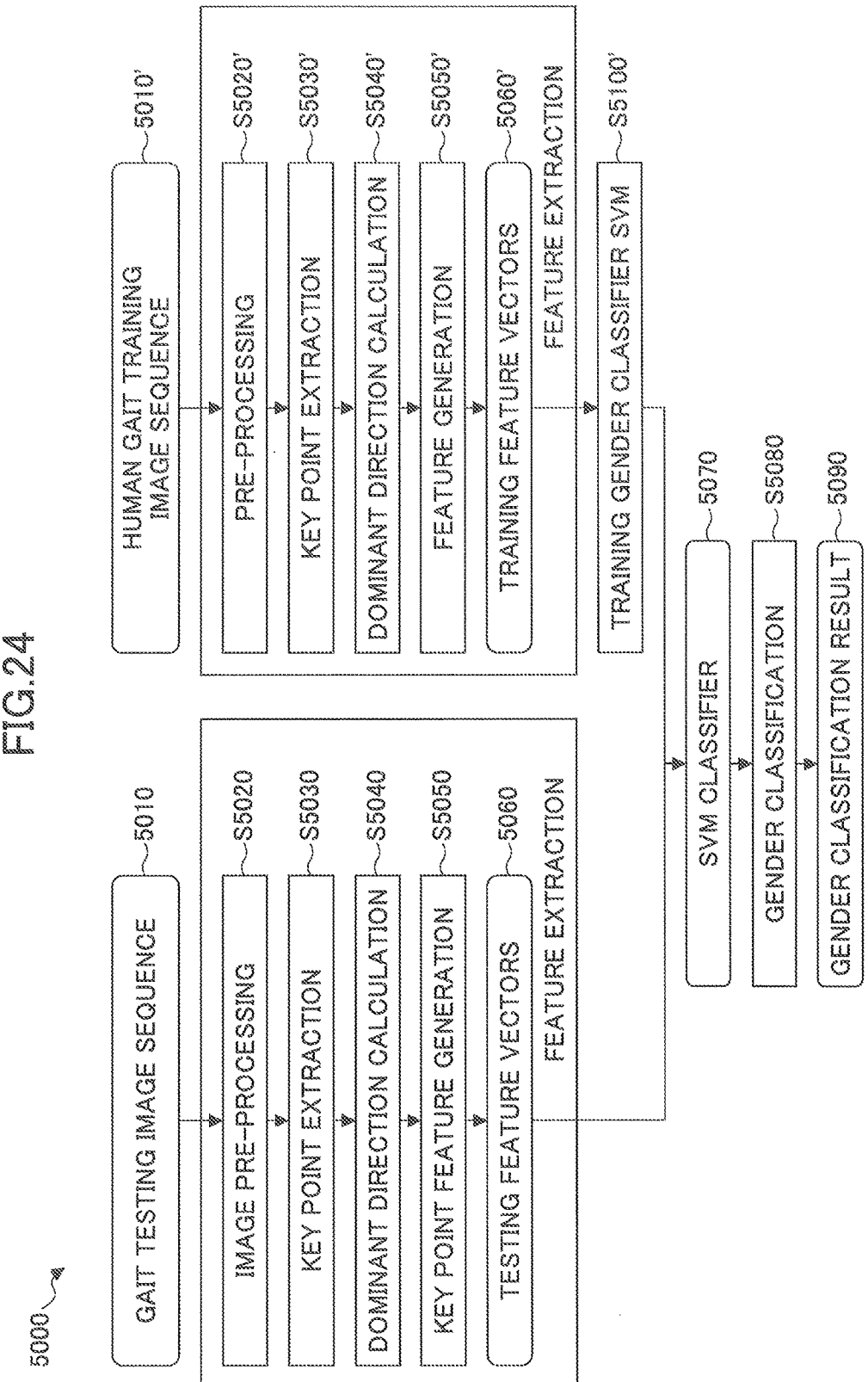
FIG. 24 is a drawing illustrating a motion object recognition method of recognizing the gender of a pedestrian based on a gait.

FIG. 24 is a drawing illustrating a motion object recognition method 5000 of recognizing the gender of a pedestrian based on a gait.

The right side of the upper part of FIG. 24 is a training process, a sequence of gait images for training 5010', such as a sequence of images of one walking cycle of persons with different genders are input.

Feature extraction of image sequences of different training samples are performed, and the feature extraction includes image pre-processing (step S5020'), key point extraction (step S5030'), dominant direction calculation of the key point (step S5040'), feature generation of the key point (step S5050'), obtainment of feature vectors for training (5060'), training of a SVM (support vector machine) classifier (step S5100'), and obtainment of the trained SVM classifier (5070).

For the input gait image sequence for testing (5010), image pre-processing, key point extraction, dominant direction calculation of the key point and feature generation of the key point (S5020-S5050) are performed, the set of feature vectors for testing (5060) is generated, and the set of the feature vectors is input into the trained SVM classifier 5070, gender classification (5080) is performed, and a gender classification result (5090) is obtained.

The motion object recognition has various applications in the real world.

For example, the motion object recognition may be applied to an advertisement push in a shopping mall that can classify objects. For example, when a person walks in front of an electronic advertising board, the gender of the person is determined based on the gait of the person, and the played advertisement is adjusted accordingly. Specifically, an advertisement of a wallet for men is played if it is determined that the person is a man, and an advertisement for a women's shoulder bag is played if it is determined that the person is a woman.

As another example, a large shopping mall may collect statistical information of customers coming into the mall, the statistical information including gender information, age information and the like.

As another example, in a remote hospital, an abnormal situation such as brain dysfunction of a patient may be automatically diagnosed based on the gait of the patient.

As another example, in an airport or a railway station, an action of a person may be automatically recognized, it is determined whether a dangerous action is performed, and corresponding warning or security measures are taken accordingly.

<6. Computation System for Motion Object Expression>
<5. Computation System for Tracking Object>

Figure 25:
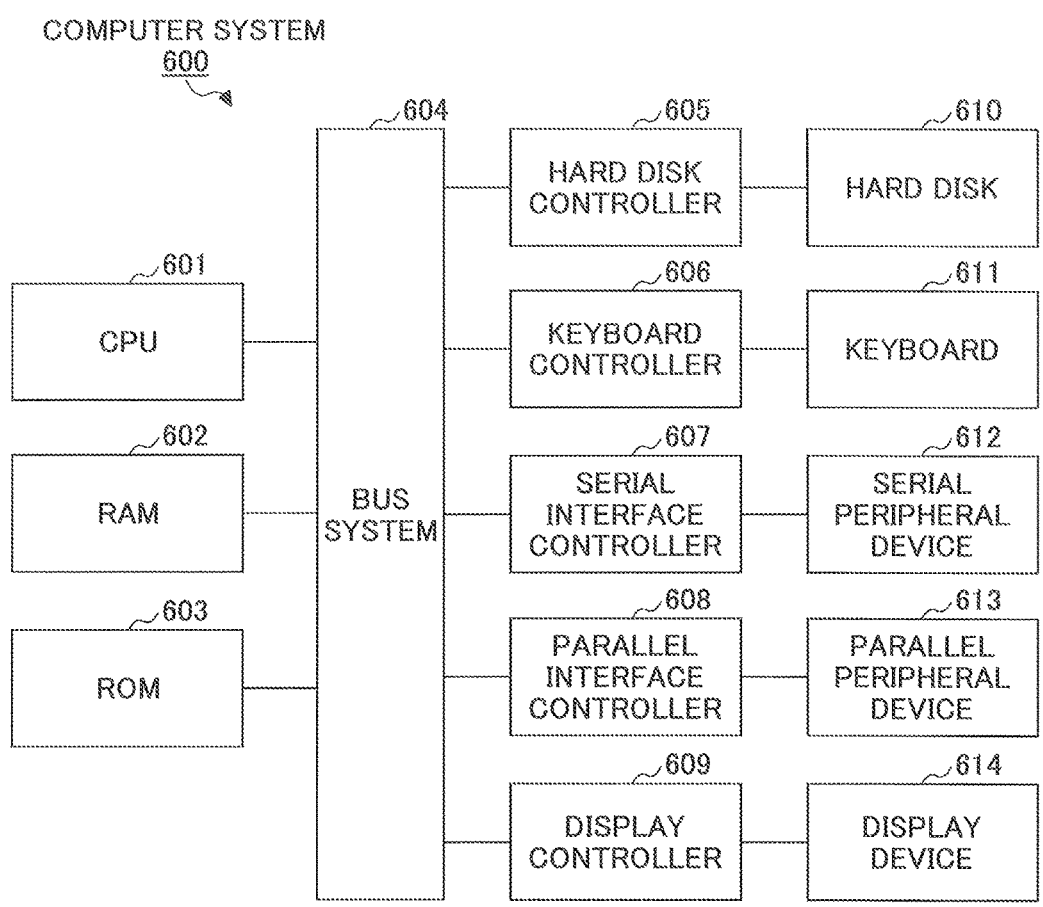
FIG. 25 is a block diagram illustrating a computation system for implementing the embodiment of the present invention.

The present invention may also be implemented as a computation system for tracking an object. FIG. 25 is a block diagram illustrating a computation system 600 for implementing the embodiment of the present invention. As illustrated in FIG. 25, the computation system (computer system) 600 may include a CPU 601, a RAM (Random Access Memory) 602, a ROM (Read-Only Memory) 603, a system bus (bus system) 604, a hard disk controller 605, a keyboard controller 606, a serial interface controller 607, a parallel interface controller 608, a display controller 609, a hard disk 610, a keyboard 611, a serial peripheral device 612, a parallel peripheral device 613 and a display device 614. In these devices, the system bus 604 is coupled to the CPU 601, the RAM 602, the ROM 603, the hard disk controller 605, the keyboard controller 606, the serial interface controller 607, the parallel interface controller 608 and the display controller 609. The hard disk 610 is coupled to the hard disk controller 605, the keyboard 611 is coupled to the keyboard controller 606, the serial peripheral device 612 is coupled to the serial interface controller 607, the parallel peripheral device 613 is coupled to the parallel interface controller 608, and the display device 614 is coupled to the display controller 609. It should be noted that, the configuration block diagram of FIG. 25 is only for the description, and the present invention is not limited to this diagram. In some cases, some devices may be added or removed as necessary.

The present invention may be implemented as a system, an apparatus, a method or a computer program product. Therefore, the present invention may be specifically implemented as hardware, software (including firmware, resident software, micro-code, etc.) a combination of hardware and software, which is referred to as a "circuit", "module", "apparatus" or "system". Additionally, the present invention may also be implemented as a computer program product in one or more computer-readable media, and the computer-readable media includes computer-readable computer codes.

Any combinations of one or more computer-readable media may be used. The computer-readable medium may be a computer-readable signal medium or a computer-readable storage medium. The computer-readable storage medium may be, for example, a system, apparatus or an element of electric, magnetic, optic, electromagnetic, infrared or semiconductor, or a combination of any of the above, but is not limited to them. Specifically, the computer-readable storage medium may include a single electrical connection having a plurality of wires, a portable computer disk, a hard disk, a random access memory (RAM), a read-only memory, an erasable programmable read-only memory (an EPROM or a Flash memory), an optical fiber, a portable compact disc read-only memory (CD-ROM), an optical memory device, a magnetic storage device, or a suitable combination of any of the above. In the present specification, the computer-readable storage medium may include tangible medium including or storing a program, and the program may be used by an instruction execution system, apparatus, device or a combination thereof.

The computer-readable signal medium may include data signals to be propagated as a part of a carrier wave, where computer-readable program codes are loaded. The propagated data signals may be electromagnetic signals, optical signals or a suitable combination thereof, but is not limited to these signals. The computer-readable medium may also be any computer-readable medium except the computer-readable storage medium, the computer-readable medium may send, propagate or transmit a program used by an instruction execution system, apparatus, device or a combination thereof.

The program codes included in the computer-readable medium may be transmitted by any media, such as wireless, wire, optical cable, RF or any combinations thereof.

The computer program codes for executing the operation of the present invention may be edited by one or more programming languages or a combination thereof. The programming languages include an object-oriented language such as JAVA, Smalltalk, C++, and a procedural programming language such as C or similar programming languages. The program codes may be executed on a user's computer completely or partly, be executed as an independent software package, be executed on a user's computer partly and a remote computer partly, or be executed on a remote computer or server completely. The remote computer may be connected to the user's computer via any networks such as a local area network (LAN) or a wide area network (WAN), or may be connected to an external computer (for example by an internet provided by an internet service provider).

The present invention is described with reference to the flowcharts and/or block diagrams of the method, apparatus (system) and computer program products according to the embodiments of the present invention. It should be noted that, each block and a combination of the blocks in the flowcharts and/or the block diagrams may be implemented by computer program instructions. The computer program instructions may be provided to a processor of a general-purpose computer, a special purpose computer or other programmable data processing apparatus, and the computer program instructions are executed by the computer or other programmable data processing apparatus to implement functions/operations in the flowcharts and/or the block diagrams.

The computer program instructions may also be stored in the computer-readable medium for making the computer or other programmable data processing apparatus operate in a specific manner, and the instructions stored in the computer-readable medium may generate manufactures of an instruction means for implementing the functions/operations in the flowcharts and/or the block diagrams.

The computer program codes may also be loaded on the computer, other programmable data processing apparatus or other device, so as to execute a series of operation steps in the computer, other programmable data processing apparatus or other device, so that the instructions executed in the computer or other programmable apparatus can provide a process for implementing the functions/operations in the flowcharts and/or block diagrams.

The available system structure, functions and operations of the system, method and computer program product according to the present invention are illustrated by the flowcharts and block diagrams in the drawings. Each of the blocks in the flowcharts or block diagrams represent a module, program segment or a part of codes, and the module, program segment or the part of codes include one or more executable instructions for implementing logic functions. It should be noted that, in the apparatus or method of the present invention, units or steps may be divided and/or recombined. The division and/or recombination should be regarded as an equivalent embodiment of the present invention. Steps of the above method may be performed in a time order, however the performed sequence is not limited to the time order. Any steps may be performed in parallel or independently.

The above description is just for explanation, and modifications and/or replacement may be performed.

For example, in the above description, after the motion dominant direction of the key point is obtained, the directions of the motion vectors in the image plane are adjusted (rotated), and the magnitude of the motion vectors of the depth direction are adjusted, when the motion vectors of the pixels within the region surrounding the key point. However, it is just an example, the present invention is not limited to this example, and the direction of the motion vectors in the depth direction may also be adjusted (for example, rotated).

Furthermore, in the above description, in the feature extraction of the motion object, the feature extraction is performed for only the motion region. However, it is just an example, the present invention is not limited to this example, and features of the motion object with respect to a stationary region may also be extracted, the recognition of the motion object may be performed by combining the features relating to the motion region and the features relating to a stationary region.

Additionally, in the above description, a sequence of images (such as an image sequence of one walking cycle of a person) serves as a sample unit of training or testing. However, it is just an example, and a single image may also be used as a sample unit of training or testing.

Furthermore, in the above description, as an example of the applied classifier, an SVM classifier is described. However, it is just an example, and other types of classifier such as nearest neighbor classifier, neural network classifier and the like may also be applied.

In addition, in the above description, after the feature vector of the key point is obtained, the set of the feature vectors of the key points is regarded as the feature vector of the motion object. However, it is just an example, the present invention is not limited to this example, and a further operation such as statistics, section segmentation or the like may also be performed for the feature vectors of the key points to obtain feature vectors for a subsequent processing with a higher level as necessary.

The present invention is not limited to the specifically disclosed embodiments, and various modifications, combinations and replacements may be made without departing from the scope of the present invention.

The present application is based on and claims the benefit of priority of Chinese Priority Application No. 201410069754.2 filed on Feb. 27, 2014, the entire contents of which are hereby incorporated by reference.

What is claimed is:

1. A method for expressing a motion object, the method comprising:
   obtaining a stereo image of the motion object, the stereo image including a depth image;
   extracting a key point from the motion object in the stereo image;
   determining a dominant direction of the key point, based on statistical information associated with three-dimensional motion of pixels within a first region surrounding the key point wherein determining the dominant direction includes, obtaining a two-dimensional histogram having a first dimension and a second dimension, the first dimension being a depth of motion vectors of the pixels and the second dimension being directions of components of the motion vectors of the pixels in planes perpendicular to the depth, and determining the dominant direction of the key point based on a direction relating to a peak value in the two-dimensional histogram;

determining, based on the dominant direction of the key point, motion vectors of pixels within a second region surrounding the key point to obtain rotation invariant motion vectors; and generating, based on the determined motion vectors of the pixels within the second region surrounding the key point, a feature associated with the key point; and generating a classification signal based on the generated feature, the classification signal including information indicating a classification of the motion object.

2. The method for expressing a motion object according to claim 1, wherein extracting the key point from the motion object in the stereo image includes obtaining, from the depth image, a motion region representing a motion part of the motion object, and extracting the key point from the motion region.

3. The method for expressing a motion object according to claim 2, wherein obtaining the motion region representing the motion part of the motion object from the depth image includes performing a division of the depth image and previous temporal depth images to obtain a sequence of motion object regions, taking statistics of appearance frequencies of pixels at each position in the motion object regions, and determining and removing, based on the appearance frequencies of the pixels, substantially stationary parts from the motion object regions.

4. The method for expressing a motion object according to claim 1, wherein the generating the feature associated with the key point based on the determined motion vectors of the pixels within the second region surrounding the key point includes calculating a motion direction histogram of the determined motion vectors of the pixels in the second region, and generating the feature associated with the key point based on the motion direction histogram.

5. The method for expressing a motion object according to claim 1, the method further comprising:

for one or more of temporal sample depth images of the motion object in at least one motion period, performing operations of extracting the key point, determining the dominant direction of the key point, rotating the motion vectors of the pixels and generating the feature associated with the key point, and obtaining a set of features of the key point for training; and training a classifier based on the set of features of the key point for training.

6. The method for expressing a motion object according to claim 5, the method further comprising:

receiving one or more of temporal test depth images of the motion object in at least one motion period, performing operations of extracting the key point, determining the dominant direction of the key point, rotating the motion vectors of the pixels and generating the feature associated with the key point, and obtaining a set of the features of the key point for testing; and classifying, based on the set of features of the key point for testing and the trained classifier, the motion object relating to the test depth images.

7. The method for expressing a motion object according to claim 1, wherein determining the motion vectors of the pixels within the second region surrounding the key point based on the dominant direction of the key point includes rotating an image reference coordinate system based on the dominant direction of the key point, and determining the second region surrounding the key point in the rotated image reference coordinate system.

8. The method for expressing a motion object according to claim 7, wherein determining the motion vectors of the pixels within the second region surrounding the key point includes for the pixels whose motion vectors have been calculated, converting the calculated motion vectors and obtaining the motion vectors of the pixels in the rotated image reference coordinate system, and for the pixels whose motion vectors have not been calculated, calculating the motion vectors of the pixels in the rotated image reference coordinate system.

9. An apparatus for expressing a motion object, the apparatus comprising:

a memory configured to store computer-readable instructions; and a processor configured to execute the computer-readable instructions to, obtain a stereo image in which the motion object has been captured, the stereo image including a depth image;

extract a key point from the motion object in the stereo image;

determine, based on statistical information relating to three-dimensional motion of pixels within a first region surrounding the key point, a dominant direction of the key point, the determining the dominant direction including, obtaining a two-dimensional histogram having a first dimension and a second dimension, the first dimension being a depth of motion vectors of the pixels and the second dimension being directions of components of the motion vectors of the pixels in planes perpendicular to the depth, and determining the dominant direction of the key point based on a direction relating to a peak value in the two-dimensional histogram;

determine, based on the dominant direction of the key point, motion vectors of pixels within a second region surrounding the key point; and generate, based on the determined motion vectors of the pixels within the second region surrounding the key point, a feature associated with the key point; and generate a classification signal based on the generated feature, the classification signal including information indicating a classification of the motion object.

10. The apparatus for expressing a motion object according to claim 9, wherein the processor is configured to execute the computer-readable instructions to, obtain, from the depth image, a motion region representing a motion part of the motion object, and extract the key point from the motion region.

11. The apparatus for expressing a motion object according to claim 10, wherein the processor is configured to execute the computer-readable instructions to
perform a division of the depth image and previous temporal depth images to obtain a sequence of motion object regions,
take statistics of appearance frequencies of pixels at each position in the motion object regions, and
determine and remove, based on the appearance frequencies of the pixels, substantially stationary parts from the motion object regions.

12. The apparatus for expressing a motion object according to claim 9, wherein the processor is configured to execute the computer-readable instructions to
calculate a motion direction histogram of the determined motion vectors of the pixels in the second region, and
generate the feature associated with the key point based on the motion direction histogram.

13. The apparatus for expressing a motion object according to claim 9, wherein the processor is configured to execute the computer-readable instructions to
for one or more of temporal sample depth images of the motion object in at least one motion period,
perform operations of extracting the key point, determining the dominant direction of the key point, rotating the motion vectors of the pixels and generating the feature associated with the key point, and
obtain a set of features of the key point for training; and
train a classifier based on the set of features of the key point for training.

14. The apparatus for expressing a motion object according to claim 13, wherein the processor is configured to execute the computer-readable instructions to
receive one or more of temporal test depth images of the motion object in at least one motion period,
perform-operations of extracting the key point, determining the dominant direction of the key point, rotating the motion vectors of the pixels and generating the feature associated with the key point,
obtain a set of features of the key point for testing; and
classify, based on the set of features of the key point for testing and the trained classifier, the motion object relating to the test depth images.

15. The apparatus for expressing a motion object according to claim 9, wherein the processor is configured to execute the computer-readable instructions to
rotate an image reference coordinate system based on the dominant direction of the key point, and
determine the second region surrounding the key point in the rotated image reference coordinate system.

16. The apparatus for expressing a motion object according to claim 15, wherein the processor is configured to execute the computer-readable instructions to
for the pixels whose motion vectors have been calculated, convert the calculated motion vectors and obtain the motion vectors of the pixels in the rotated image reference coordinate system, and
for the pixels whose motion vectors have not been calculated, calculate the motion vectors of the pixels in the rotated image reference coordinate system.

17. A method, comprising:
obtaining a stereo image in which a motion object has been captured, the stereo image including a depth image;
obtaining, from the depth image, a motion region representing a motion part of the motion object, the obtaining including,
performing a division of the depth image and previous temporal depth images to obtain a sequence of motion object regions,
taking statistics of appearance frequencies of pixels at each position in the motion object regions, and
determining and removing, based on the appearance frequencies of the pixels, basically stationary parts from the motion object regions;
extracting a key point from the motion region; and
generating a classification signal based on the key point, the classification signal including information indicating a classification of the motion object.

18. The method of claim 17, further comprising:
obtaining a two-dimensional histogram including first and second dimensions, the first dimension being a depth of motion vectors of the pixels and the second dimension being directions of components of the motion vectors of the pixels in planes perpendicular to the depth, and
determining a dominant direction of the key point based on a direction relating to a peak value in the two-dimensional histogram.

* * * * *